(12) United States Patent
Marchant et al.

(10) Patent No.: US 11,383,214 B2
(45) Date of Patent: Jul. 12, 2022

(54) STRIPPER AND PACKING APPARATUSES

(71) Applicant: T.EN Process Technology, Inc., Houston, TX (US)

(72) Inventors: Paul Marchant, Katy, TX (US); Raj Kanwar Singh, Katy, TX (US); Millard Alamath Carter, Katy, TX (US); Roberto Ellis, Santa Fee, TX (US); Dilip Dharia, Sugarland, TX (US)

(73) Assignee: T.EN Process Technology, Inc., Houston, TX (US)

( * ) Notice: Subject to any disclaimer, the term of this patent is extended or adjusted under 35 U.S.C. 154(b) by 0 days.

(21) Appl. No.: 17/058,330

(22) PCT Filed: May 24, 2019

(86) PCT No.: PCT/US2019/034006
§ 371 (c)(1),
(2) Date: Nov. 24, 2020

(87) PCT Pub. No.: WO2019/227049
PCT Pub. Date: Nov. 28, 2019

(65) Prior Publication Data
US 2021/0094010 A1 Apr. 1, 2021

Related U.S. Application Data

(60) Provisional application No. 62/675,975, filed on May 24, 2018.

(51) Int. Cl.
*B01J 8/34* (2006.01)
*B01J 19/32* (2006.01)

(52) U.S. Cl.
CPC ............. *B01J 8/34* (2013.01); *B01J 19/32* (2013.01); *B01J 2219/32213* (2013.01); *B01J 2219/32234* (2013.01); *B01J 2219/3325* (2013.01)

(58) Field of Classification Search
CPC ... B01J 8/1881; B01J 8/189; B01J 8/34; B01J 8/125; B01J 2208/0057; B01J 2208/0084;
(Continued)

(56) References Cited

U.S. PATENT DOCUMENTS 1,360,928 A * 11/1920 Goodwin ............... B01J 19/30
261/95
3,099,538 A * 7/1963 Kronig et al. ........... B01J 8/34
422/139
(Continued)

OTHER PUBLICATIONS

International Search Report and Written Opinion issued in corresponding PCT application No. PCT/US19/34006, dated Oct. 18, 2019.
(Continued)

*Primary Examiner* — Lessanework Seifu
(74) *Attorney, Agent, or Firm* — Locke Lord LLP; Alan B. Clement; Alicia J. Carroll

(57) ABSTRACT

A packing system includes a first packing element layer including a plurality of blades and a second packing element layer including a plurality of blades. The packing system includes intra-layer variation and/or inter-layer variation. Intra-layer variation includes (i) varying spacing between blades within the first and/or the second packing element layer, (ii) varying sizes of the blades within the first and/or the second packing element layer, and/or (iii) varying angle of inclination of the blades within the first and/or second packing element layer. Inter-layer variation includes the blades of the first packing layer having a first spacing, a first size and a first angle of inclination, and the blades of the (Continued)

second packing layer having a second spacing, a second size, and a second angle of inclination. The second spacing, size, and/or angle of inclination is different from the first spacing, size, and/or angle of inclination.

23 Claims, 19 Drawing Sheets

(58) Field of Classification Search
CPC .............. B01J 2208/00938; B01J 19/32; B01J 2219/32213; B01J 2219/32234; B01J 2219/33325
See application file for complete search history.

(56) References Cited

U.S. PATENT DOCUMENTS

| | | | |
|---|---|---|---|
| 3,489,208 A * | 1/1970 | Manteufel | B01F 5/0644 165/109.1 |
| 3,914,351 A | 10/1975 | McKeown et al. | |
| 4,497,751 A * | 2/1985 | Pluss | B01D 3/24 261/112.1 |
| 4,731,229 A | 3/1988 | Sperandio | |
| 5,716,585 A | 2/1998 | Senegas et al. | |
| 5,935,896 A | 8/1999 | Dupuis et al. | |
| 6,224,833 B1 | 5/2001 | Rall | |
| 7,179,427 B2 | 2/2007 | Marchant et al. | |
| 7,332,132 B2 | 2/2008 | Hedrick et al. | |
| 8,877,133 B2 * | 11/2014 | Kowalczyk | B01J 8/26 422/144 |
| 8,936,757 B2 | 1/2015 | Gamas-Castellanos et al. | |
| 9,238,210 B2 | 1/2016 | Marchant et al. | |
| 9,388,095 B2 | 7/2016 | Leroy et al. | |
| 10,150,054 B1 | 12/2018 | Marchant et al. | |
| 2004/0101449 A1 | 5/2004 | Marchant et al. | |
| 2005/0205467 A1 | 9/2005 | Hedrick et al. | |
| 2008/0181054 A1 | 7/2008 | Kojima | |
| 2009/0269252 A1 | 10/2009 | Yuan et al. | |
| 2010/0174125 A1 | 7/2010 | Tyler et al. | |
| 2013/0172171 A1 | 7/2013 | Kowalczyk et al. | |
| 2013/0186273 A1 | 7/2013 | Llamas et al. | |
| 2015/0126356 A1 | 5/2015 | Gamas-Castellanos et al. | |
| 2015/0174545 A1 | 6/2015 | Marchant et al. | |
| 2017/0341046 A1 | 11/2017 | Le Coz | |
| 2019/0015808 A1 | 1/2019 | Maller et al. | |

OTHER PUBLICATIONS

Extended European search report issued in corresponding application No. 19808518.5, dated Feb. 3, 2022 (7 pages).

* cited by examiner

| | Zone A | Zone B | Flow Direction |
|---|---|---|---|
| Layer 1 | 70/30 | 30/70 | W ⇌ E |
| Layer 2 | 50/50 | 50/50 | ↑↓ |
| Layer 3 | 70/30 | 30/70 | W ⇌ E |
| Layer 4 | 50/50 | 50/50 | ↑↓ |
| Layer 5 | 70/30 | 30/70 | W ⇌ E |
| Layer 6 | 50/50 | 50/50 | ↑↓ |
| Layer 7 | 70/30 | 30/70 | W ⇌ E |
| Layer 8 | 50/50 | 50/50 | ↑↓ |

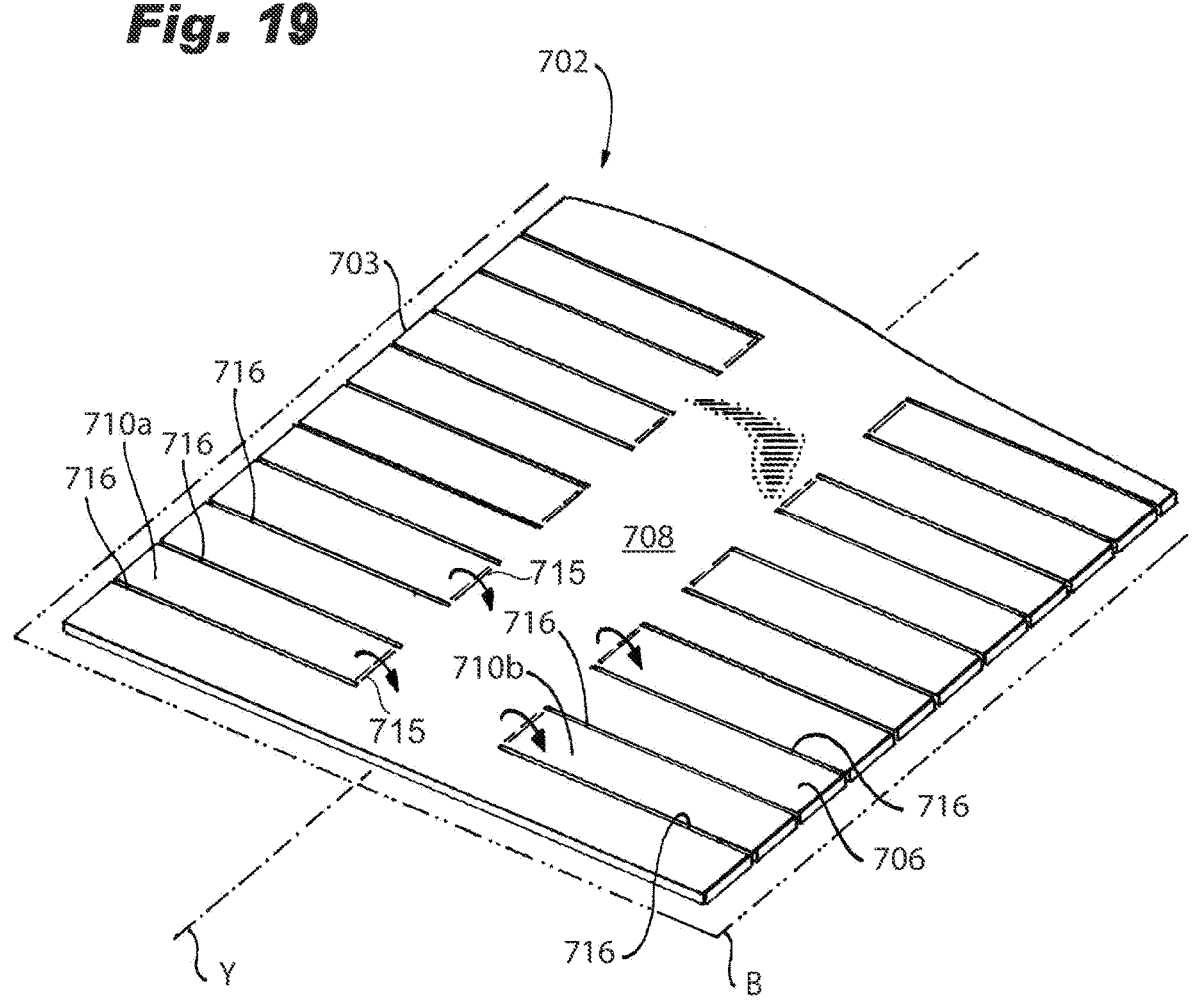

STRIPPER AND PACKING APPARATUSES

CROSS-REFERENCE TO RELATED APPLICATIONS

This application is a U.S. National Stage of PCT International Application No. PCT/US2019/034006, filed May 24, 2019, which claims benefit of and priority to U.S. Provisional Patent Application Ser. No. 62/675,975, filed May 24, 2018. The entire contents of these applications are incorporated herein by reference in their entirety.

BACKGROUND OF THE INVENTION

1. Field of the Invention

The present disclosure relates to fluidized beds in which solids and fluids flow in a countercurrent or co-current relationship. More particularly, the embodiments disclosed herein are directed to a Fluid Catalytic Cracking "FCC" stripper apparatus and internals, and more specifically to structured packing elements to facilitate contact between the solids and fluids in the fluidized bed.

2. Description of Related Art

The Fluidized Catalytic Cracking (FCC) process is a chemical process commonly used in oil refineries, the purpose of which is to convert heavy, high molecular weight hydrocarbon materials into lighter lower molecular weight hydrocarbon fractions. In this type of process a hydrocarbon feedstock is vaporized at high temperatures and at the same time placed in contact with the particles of the cracking catalyst maintained in suspension in the feedstock vapor and entrained thereby. After the cracking reactions have produced the desired molecular weight range with a corresponding drop in boiling points, the product vapor obtained is separated from the catalyst particles. The particles are subsequently stripped to recover any entrained hydrocarbons, regenerated by burning the coke formed thereon and recycled by once again being placed in contact with the feedstock to be cracked.

In this process, the desired decrease in boiling point of the hydrocarbons is brought about by controlled catalytic and thermal reactions. These reactions take place almost instantaneously when the finely atomized feedstock is brought in contact with the catalyst particles. In the short time during which the catalyst particles are in contact with the feedstock, the particles deactivate essentially because of hydrocarbon adsorption and deposition of coke and other contaminants onto the active sites of the catalyst. It is necessary to strip the deactivated catalyst continuously, for example with steam, to recover volatile hydrocarbons adsorbed and entrained in the voids prior to regeneration of the catalyst, continuously and without altering its properties, by controlled combustion of the coke in a single-stage or multistage regeneration section before recycling the catalyst particles to the reaction zone.

Stripping is one of the determining steps in the FCC process. In fact, insufficient stripping results in the reactor effluent remaining on and in between the catalyst particles so that during the regeneration step an additional combustion load is imposed upon the regenerator with excessive heat production beyond the heat needed to drive the catalytic reaction. As a result, the combustion of entrained hydrocarbon vapors into the regenerator represents a loss in final yield of converted product.

In a FCC process the stripping of the catalyst particles typically takes place in a deep fluidized bed to promote vigorous mixing, intimate contact of fluid streams and catalyst particles within a vessel and to provide sufficient residence time for stripping. Baffles, e.g. blades, and packing have been used to achieve the desired contact. Fluidized beds are usually generated by passing a fluid stream, typically a vapor stream, upwardly through a bed of solid particles at a flow rate sufficient to suspend the particles and cause a gas solid mixing within the bed.

Generally, after reactor effluents are separated from the catalyst particles, the particles are directed to a stripping chamber where stripping takes place in a descending dense fluidized phase. A gaseous fluid injected at the bottom of the chamber is used to fluidize the coked catalyst particles and displace the entrained hydrocarbons located in the interstitial spaces between the particles. It is preferential to use a polar material, such as steam, for this gaseous fluid, as it is more strongly adsorbed by the catalyst particles and thus the hydrocarbons are more readily displaced. Finally, the stripped catalyst particles are transferred to the regeneration zone.

In a FCC stripper vessel, it tends to be difficult to control the travel of the catalyst particles and to avoid partial de-fluidization linked with channeling (direct passage of large bubbles through the deep fluidized bed or preferential down flow of catalyst towards one side of the vessel) and with back-mixing (down flow of poorly fluidized particles or even recirculation of such particles, especially in the region of the stripping chamber wall). Thus, the average stripping time of deactivated catalyst particles and the quality of contact between catalyst particulates and gaseous fluid are difficult to control. Additionally, any mal distribution or preferential flow pattern of gas vapors and catalyst particles can limit the catalyst circulation capability through the stripper vessel. Generally, an excessive amount of steam is required in such scenarios to achieve sufficient stripping efficiency. The excess steam increases the gas and liquid load on equipment connected to the stripper. For example, the excess steam can increase the quantity of sour water produced per pound of hydrocarbon processed, as well as increase the operating costs for producing and processing the excess steam.

In order to overcome these problems it is necessary to utilize devices internal to the stripper chamber, such as structured packing elements, to facilitate effective mixing and improve the dispersion and the homogenization of the particles by the stripping fluid. In particular, while passing through the stripping device, the particles are redistributed in space which ensures a state of organized agitation with the fluid and promotes improved contact between the fluid and particle phases. The fluid and the particles are directed in a plurality of directions from a single flow. Moreover, the device reduces the back-mixing and channeling of the particles and the formation of solid or gaseous pockets within the stripping chamber.

The use of structured packing elements as the internal stripping device makes it possible to reduce the dimensions of the zone of contact between the solid particles and the fluid. In fact, because this contact is clearly improved, it is possible to use smaller stripping chambers compared to those of the prior art, without a loss in stripping performance even at very high catalyst fluxes through the stripping chamber. Thus, the primary purpose of the packing element is to provide uniform counter current contact of catalyst particles and steam (or other gas media); avoid gas bypassing or channeling through the catalyst bed; and reduction of gas bubble size formed in the fluidized beds.

Different structured packing elements have been proposed to improve stripping. For example, U.S. Pat. No. 6,224,833 to Rall et al., discloses a gas-solid fluidized bed formed within a contacting element having pairs of planar portions or blades arranged in intersecting planes. FIG. 7 of Rall et al. shows a form of structured packing applied to solid flow. Structured packing systems can provide excellent performance; however, they have a tendency to create channeling of the two phases. Once channeling initiates, it will continue through the bed and, if the bed is deep enough will result in almost complete phase separation. Once initiated, channeling is very difficult to stop and there may be almost complete bypassing of the two phases. Once a "clear stream" of either phase is formed the existing packing is not very effective at redistributing it, inspecting the actual packing shows that a single phase can travel considerable distances within, and between, the layers. Once they reach the next layer there is limited potential for redistribution and the single phase will continue and potentially grow.

In a FCC Stripper, the mass flow differential between the steam and catalyst is very high, and due to the nature of solids fluidization there will be a tendency to create localized channeling around the blade elements. Computational Fluid Dynamics (CFD) studies have shown that a dense layer of catalyst will form along the top side of the blades, and a stream of gas (steam) will form on the underside. This essentially halts the intermixing required for the stripping process.

Another limitation of the existing design is the two directional arrangement of the blades which provides approximately 95% open cross-sectional area and limits radial mixing. The blade arrangement allows catalyst to distribute evenly down in a localized area. On an overall scale, if the catalyst flow entering the top element is biased, it takes significant amount of packing height before it re-distributes evenly across the bed. As a result of this, upward flowing steam is also not uniformly distributed within the elements and when it leaves the top of the packing, which further reduces the usage of the steam to strip the hydrocarbons In one particular FCC stripper design, as described in U.S. Patent Application No. US 2009/0269252, which is incorporated by reference herein in its entirety, a common configuration for an FCC stripper design is shown in FIG. 1 (of the US 2009/0269252 publication). The catalyst leave the stripper through the SCSP located on one side of the stripper vessel. This causes the catalyst to flow more predominantly in the area close to the SCSP entrance. This biased catalyst flow due to asymmetric SCSP inlet results in stagnant region opposite to the SCSP entrance. The active catalyst flow region close to the SCSP entrance results in high catalyst velocity because the catalyst is only flowing through a reduced stripper cross-sectional area. This high catalyst velocity or flux region entrains a significant amount of stripping steam into the SCSP, resulting in reduced stripping due to lower upward steam velocity into the stripper.

Existing packing designs are quite dense in terms of blade count and there is significant weight that must be supported. The dense packing also presents low pressure build-up as blades can support a portion of the catalyst mass. Existing structured used in FCC strippers, e.g. those as shown in U.S. Patent Application No. US 2009/0269252, provide many benefits to the FCC process compared to the traditional disc and donut baffle systems. However, it has often not produced the expected performance improvements; raw stripping efficiency (manifested as $H_2$ in coke and regenerator temperature), pressure build up and steam consumption. The reasons for this can be attributed to phase separation around the packing elements and channeling/uneven fluidization within the packed zone. Phase separation and channeling of the steam/catalyst reduce the potential for intermixing to promote the mass transfer required for stripping.

In existing designs using long flat blades, interphase mixing within a given layer of packing is generally not promoted. CFD studies have shown development of discrete catalyst and vapor phases at the surface of the blades. This reduces the contact time and mixing required for stripping.

Current structured packing elements have various limitations, for example, reduced mixing of the stripping gas and catalyst because a portion of gas stream tends to flow up along the underside of planar portions or blades and a portion of catalyst stream tends to flow down the top side of the blade with little or no interaction between the gas and catalyst. This limits gas catalyst mixing within an element. The blade configuration of traditional packing elements allow only two directional flow of the phases within the element, which limits the radial mixing within a packing element. Despite the flow direction of each element or layer of elements being 90° oriented to each other the continuous blade surfaces do not provide good re-distribution of catalyst and gas throughout the depth of the fluidized bed.

Such conventional methods and systems have generally been considered satisfactory for their intended purpose. However, there is still a need in the art for improved packing elements and systems. Additional objects of the embodiments of the present disclosure will become apparent from the following summary and detailed discussion.

SUMMARY OF THE INVENTION

A packing system includes a first packing element layer including a plurality of blades and a second packing element layer including a plurality of blades. The packing system includes at least one of intra-layer variation or inter-layer variation. Intra-layer variation includes at least one of (i) varying spacing between blades within at least one of the first packing element layer or the second packing element layer, (ii) varying sizes of the blades within at least one of the first packing element layer or the second packing element layer or (iii) varying angle of inclination of the blades within at least one of the first packing element layer or the second packing element layer. Inter-layer variation includes the blades of the first packing layer having a first spacing, a first size and a first angle of inclination, and the blades of the second packing layer having a second spacing, a second size, and a second angle of inclination. At least one of the second spacing, the second size, or the second angle of inclination is different from at least one of the first spacing, the first size or the first angle of inclination.

In some embodiments, blades of the first packing element layer include a first set of blades having a first width and a second set of blades having a second width, wherein the second width is narrower than the first width. The first set of blades can include two groups of blades. A first of the two groups can be arranged at a primary angle of inclination and a second of the two groups is arranged at a secondary angle of inclination. The second set of blades can include two groups of blades. A first of the two groups of the second set of blades can be arranged at a third angle of inclination and a second of the two groups of the second set of blades can be arranged at a fourth angle of inclination. The primary angle of inclination can be different from the third angle of inclination. The primary angle of inclination and the second angle of inclination can be opposite angles relative to one another. The first group of the first set of blades can be parallel to one another. The second group of the second set of blades can be parallel to one another.

In some embodiments, the second set of blades includes two groups of blades. A first of the two groups of the second set of blades can be arranged at a primary inclination angle and a second of the two groups of the second set of blades can be arranged at a secondary inclination angle. The primary inclination angle and the secondary inclination angle can be opposite angles. The first group of the second set of blades can be parallel to one another. The second group of the second set of blades can be parallel to one another.

The blades of the first packing element layer can be separated from adjacent blades of the first packing element layer by a first spacing, wherein blades of the second packing element layer can be separated from adjacent blades of the second packing element layer by a second spacing, The second spacing can be smaller than the first spacing.

The system can include at least one additional packing element layer. The at least one additional packing element layer can be positioned vertically below the second packing element layer opposite from the first packing element layer. The at least one additional packing element layer can include a plurality of blades. The blades of the additional packing element layer can have the same angle, spacing and sizing as the blades of the first packing element layer. The angle of inclination of the blades of the additional packing element layer can be the same as, and opposite from the blades of the first packing element layer.

In accordance with another aspect, a packing system includes a at least one hollow tapered body to facilitate contact between solids and fluids in a fluidized bed.

The at least one hollow tapered body can include a plurality of hollow tapered bodies. At least one of the plurality of hollow tapered bodies can abut at least one adjacent hollow tapered body. The at least one hollow tapered body can include slots positioned around a perimeter. The at least one hollow tapered body can include a longitudinally extending ligament positioned between each slot. At least one ligament can include a hole. Each longitudinal extending ligament can extend between a top edge of the hollow tapered body and a bottom edge of the hollow tapered body. The at least one hollow tapered body is a frustoconical hollow body.

The system can include a gas path. The at least one hollow tapered body can converge from an upstream portion of the gas path to a downstream portion of the gas path. The at least one hollow tapered body can include a first hollow tapered body and a second hollow tapered body. The first and second hollow tapered bodies each can include respective longitudinally extending ligaments and a respective bottom edge. A portion of the bottom edges of the first and second hollow tapered bodies can abut one another. Each longitudinally extending ligament can define a respective ligament axis, wherein, when projected on to a plane perpendicular to a longitudinal body axis of the first hollow tapered body, the ligament axes of the first hollow tapered body and the ligament axes of the second hollow tapered body can be not co-axial. The at least one hollow tapered body can include at least a partially closed top surface.

The at least one hollow tapered body can include a plurality of hollow tapered bodies. Each hollow tapered body can define a longitudinal body axis. The plurality of hollow tapered bodies can be arranged into a first layer having a first group of the plurality of hollow tapered bodies and a second layer can have a second group of the plurality of hollow tapered bodies positioned above the first layer. Respective bottom edges of the plurality of hollow tapered bodies of the second group can abut respective top edges of the plurality of hollow tapered bodies of the first group. The first layer can be offset from the second layer such that the longitudinal body axes of the hollow tapered bodies of the first layer can be not co-axial with the longitudinal body axes of the hollow tapered bodies of the second layer.

In accordance with another aspect, at least one packing element defines a longitudinal axis and is configured to facilitate contact between solids and fluids in a fluidized bed. The at least one packing element includes a common cross-bar defined parallel to the longitudinal axis and a plurality of primary blades extending at an angle from the common cross bar. A primary element plane is defined by a blade axis of at least one of the primary blades and the longitudinal axis. The at least one packing element including at least one additional blade extending in a secondary plane. The secondary plane is not parallel to the element plane.

The at least one packing element can include two packing elements. The at least one additional blade of the first packing element can intersect an element plane of a second of the two packing elements. The primary blades can be spaced apart from one another along the longitudinal axis. The at least one additional blade can include a plurality of additional blades. The primary blades and the additional blades can extend from both lateral sides of the cross-bar. The at least one additional blade can include a plurality of additional blades. The primary blades and the additional blades can alternate with one another along the longitudinal axis. The two packing elements can form a mixing chamber. The mixing chamber can be defined between one of the primary blades and the additional blade of a first of the two packing elements and one of the primary blades and the additional blade of a second of the two packing elements. The shape of the mixing chamber, when projected on a plane perpendicular to a longitudinal axis of the first packing element, can be a parallelogram.

The at least one packing element can be formed from a unitary material sheet. The at least one packing element can include a plurality of packing elements that form a layer of the packing system. A second group of the packing elements can form a second layer of the packing system. The second layer can be positioned vertically above the first layer The first and second layers can define a vertically oriented axis parallel to an overall vapor flow direction. The element planes of each packing element of the first and second layers can be oblique with respect to the vertically oriented axis.

In accordance with another aspect, a process for fluidizing solid particles within a vessel having a shell and at least one packing system includes providing a quantity of said particles within the packing system and producing fluidization of the solid particles with the packing system by flowing at least one gas stream through the packing system. The at least one packing system includes at least one of the packing systems described above.

The process can include directing the solid particles through the packing system in a direction countercurrent to a flow direction of the gas stream. The process can include providing additional quantities of solid particles within the packing system while removing at least some of the fluidized solid particles from the packing system while the gas stream is flowing through the packing system. The process can include retaining the quantity of solid particles within the packing system while the gas stream is flowing through the packing system. The solid particles can be catalyst particles associated with volatile hydrocarbons, and wherein while flowing the gas stream through the packing system at least some of the volatile hydrocarbons can be stripped from the catalyst particles by the gas stream during said fluidization. The gas stream can include water vapor. The solid particles can be catalyst particles containing coke deposits. The process can include burning the coke deposits to cause regeneration of the catalyst particles during flowing said gas stream through the contacting device.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 19 is a schematic perspective view of a portion of the packing system of FIG. 15, showing a portion of one of the packing elements before bending.

DETAILED DESCRIPTION OF THE INVENTION

Figure 1:
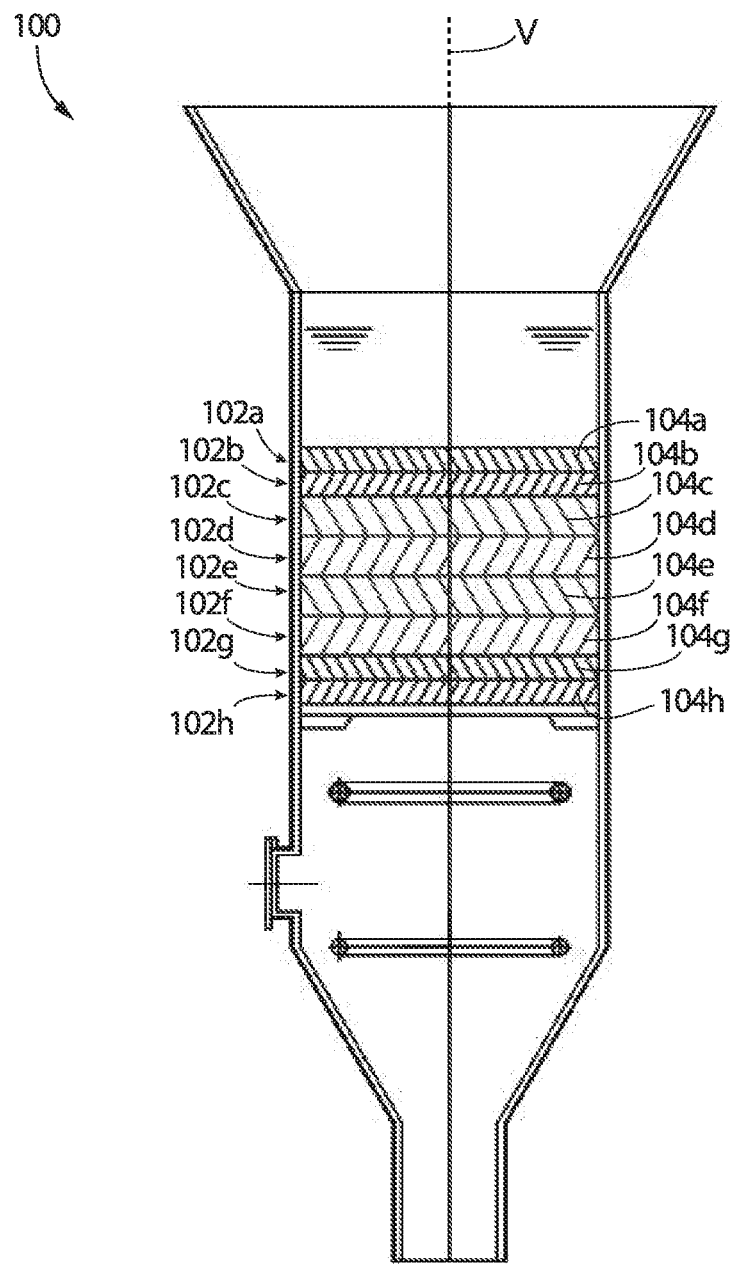
FIG. 1 is a schematic side view of a FCC stripper vessel having a packing system constructed in accordance with an embodiment of the present disclosure, showing a plurality of packing element layers.

Embodiments of the disclosure are described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the embodiments to those skilled in the art. Like numbers refer to like, but not necessarily the same or identical, elements throughout. For purposes of explanation and illustration, and not limitation, a schematic representation of an exemplary embodiment of a packing system configured to facilitate contact between solids and fluids in a fluidized bed constructed in accordance with embodiments of the present disclosure is shown in FIG. 1 and is designated generally by reference character 100. Other embodiments of packing systems in accordance with the disclosure, or aspects thereof, are provided in FIGS. 2-19B, as will be described.

FIGS. 1-6B show packing systems 100 that include optimization for FCC stripper performance through the use of a multi-zone approach using multi-size structured packing and/or more than one type of internal. As shown in FIGS. 5A-6B, stripping packing in FCC vessels with asymmetrical standpipes having multiple blade widths and blade spacing variations within a packing element layer or across layers provides a more even gas catalyst flow distribution across the catalyst bed (sometimes simply referred to as "bed" throughout). The catalyst bed is a dense, yet fluidized, collection of catalyst particles, into which a stripping media (typically steam) is injected to remove volatile hydrocarbons. The steam acts to maintain the fluidized state of the particles, internals in the stripper bed act to maintain close contact between the stripping media (e.g. packing system 100) and the particles.

As shown in FIGS. 1-4A, a packing system 100 includes a plurality of packing element layers 102a-102h. The vessel 103 of FIGS. 1-4A is shown in cross-section to expose a side view of the packing element layers 102a-102h. Each packing element layer 102a-102h includes a plurality of blades 104a-104h. Each of the blades 104a-104h has a rectangular shape similar to blades shown in FIG. 6A, the blades 104a-104h can also be arranged in parallel rows (similar to the blades of FIG. 6A) to form a layer. The layer can be cylindrical or annular in shape, or a variety of other suitable shapes. The packing system 100 includes intra-layer variation and/or inter-layer variation. Intra-layer variation is variation or non-uniformity within a given one of the packing element layers 102a-102h. The intra-layer variation includes varying spacing between blades 104a-104h of their respective packing element layer 102a-102h, varying sizes of the blades 104a-104h across their respective packing element layer 102a-102h, and/or varying the angle of inclination of blades 104a-104h across their respective packing element layer 102a-102h. Inter-layer variation includes the blades 104a-104h of a given one of the packing layers 102a-102h having a first spacing, a first angle of inclination, and a first size, and the blades of a separate one of the packing layers 102a-102h having a second spacing, a second angle of inclination, or a second size. The second spacing, the second angle of inclination, and/or the second size is different from the first spacing, the first angle of inclination, and/or the first size.

As shown in FIG. 1, system 100 includes a first packing element layer 102a with blades 104a that are closer together than blades 104c of a third packing element layer 102c. Blades 104a of first packing element layer 102 are also shorter in length (e.g. they vary in size) when compared to blades 104c of third packing element layer 102c. FIGS. 2-4A show various embodiments of inter-layer variation with respect to size of blades 104a-104h, spacing between blades 104a-104h, and the angle of inclination of blades 104a-104h. Spacing between blades is defined as a perpendicular distance between the face plates of blades 104a-104h.

The structured packing of FIGS. 1-4A, with multi-sized modular design, optimizes FCC stripper performance through the use of a multi-zone approach using multi-size structured packing and/or more than one type of internal. For FIGS. 1-4A, a "zone" includes at least one packing element layer 102a-102h. For example, for the embodiment of FIG. 1, a first zone includes layers 102a and 102b, where each layer 102a and 102b is similar in structure to one another. A second zone of the embodiment of FIG. 1 includes layers 102c-102f, where layers 102c-102f are of a similar structure to one another.

Multiple embodiments for various packing arrangements are presented to achieve the objectives described herein. FIG. 1 shows the tighter packing elements at top and bottom layers, e.g. layers 102a-102b and 102g-102h, whereas the middle zone is filled with layers having more open packing elements, e.g. the third, fourth, fifth and sixth layers 102c-102f, respectively. The top two layers 102a-102b promote good distribution of catalyst downward (as oriented in FIGS. 1-4A) into the bed, and the bottom two layers 102g-102h will help to distribute steam traveling upwards (as oriented in FIGS. 1-4A) evenly into the bed. The tighter-packed blades 104a-104b of packing layers 102a and 102b of FIG. 1 provide a zone that provides optimized catalyst distribution, where the more open zone formed by layers 102c-102f is optimized for better fluidization. A third zone of FIG. 1 is formed by bottom two layers 102g-102h and includes tighter packed blades 104g-104h and provides optimized steam distribution. Use of multi-size structured packing or multiple types of internals will allow an optimized configuration to achieve improved stripping efficiency and improved fluidization. Improved stripping performance allows less stripping steam to be use, require fewer internals, provide improved product recovery, and reduces coke load to the regeneration system. For revamp projects a multi-zone approach will also provide additional flexibility to meet objectives. The multi-zone approach provides improved stripping efficiency by optimizing catalyst/vapor contact and improve fluidization of the catalyst bed in a FCC stripper.

Figure 2:
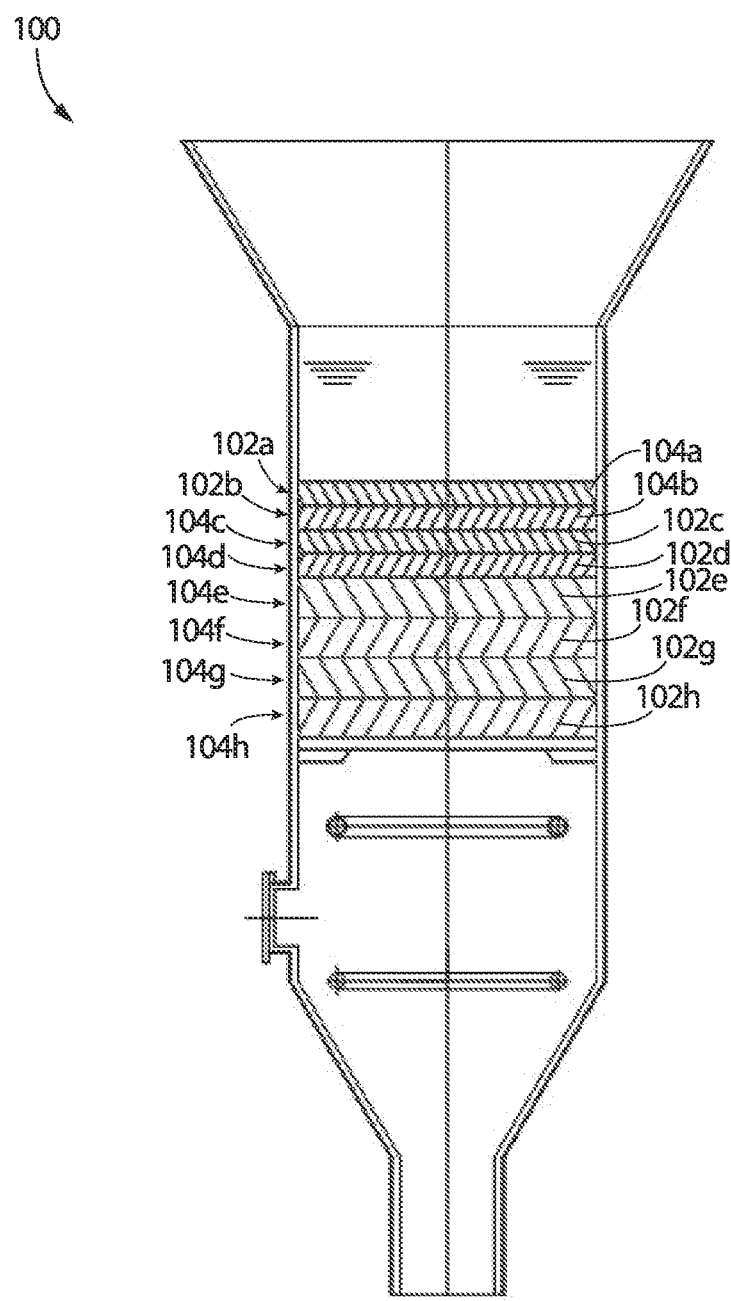
FIG. 2 is a schematic side view of a FCC stripper vessel having a packing system constructed in accordance with another embodiment of the present disclosure, showing a plurality of packing element layers.

FIG. 2 shows another embodiment of system 100, where the top four layers 102a-102d have tighter packed blades 104a-104d to maximize steam catalyst interaction and the stripping efficiency. The bottom four layers 102e-102h of FIG. 2 are essentially to keep the bed uniformly fluidized. FIG. 2 shows a first zone having the top four layers 102a-102d where the top four layers 102a-102d are similar in structure to one another. The tighter-packed blades 104a-104d of packing layers 102a-102d of FIG. 2 provide a zone that provides optimized steam and catalyst distribution, A second zone of FIG. 2 includes the bottom four layers 102e-102h, where the bottom four layers 102e-102h are of a similar structure to one another. The more open zone formed by layers 102e-102h of FIG. 2 is optimized for better fluidization (e.g. more uniform).

Figure 3:
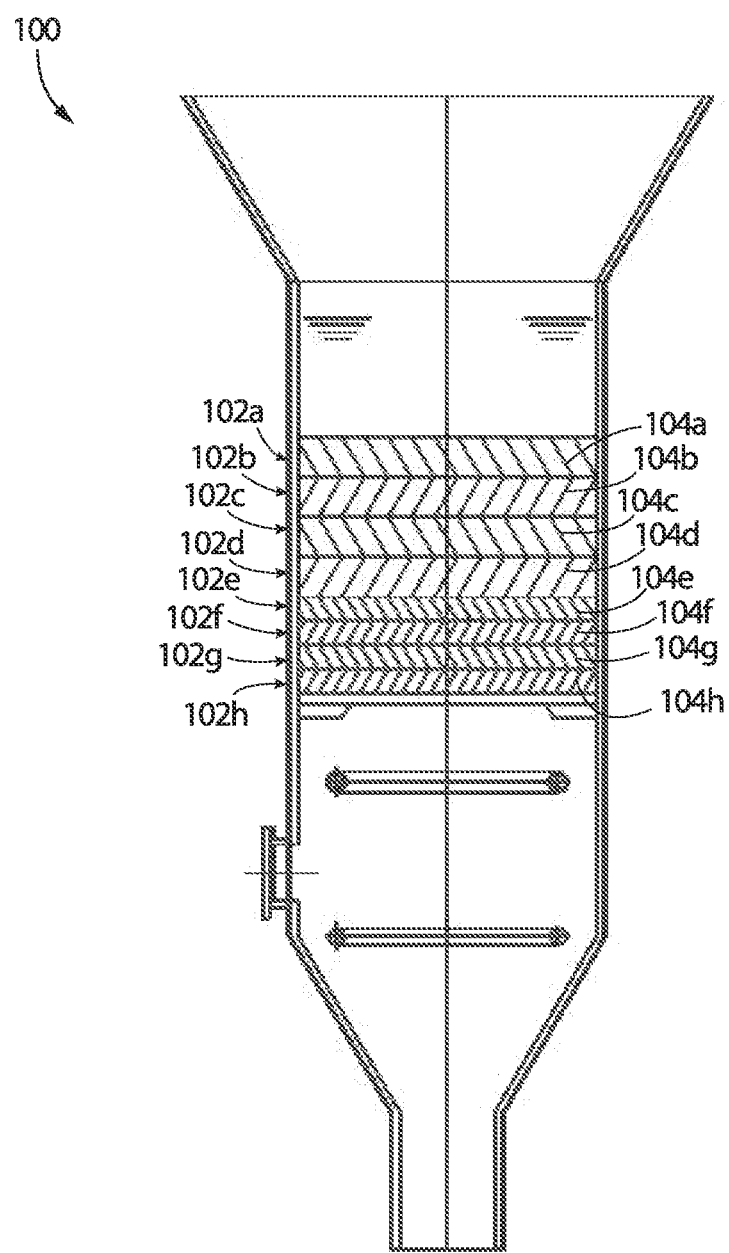
FIG. 3 is a schematic side view of a FCC stripper vessel having a packing system constructed in accordance with another embodiment of the present disclosure, showing a plurality of packing element layers.

FIG. 3 another embodiment of system 100, where the top four layers 102a-102d have more spaced apart blades 104a-104d to allow sufficient open area for self-stripping of hydrocarbons from the spent catalyst and tighter elements are used at the bottom to maximize steam catalyst interaction and the stripping efficiency. FIG. 3 shows a first zone having top layers 102a-102d where top layers 102a-102d are similar in structure to one another. The more open zone formed by top layers 102a-102d of FIG. 3, e.g. with less closely packed blades 104a-104d, is optimized for better fluidization (e.g. more uniform). A second zone of FIG. 3 includes the bottom four layers 102e-102h, where the bottom four layers 102e-102h are of a similar structure to one another. The tighter-packed blades 104e-104h of the bottom four packing layers 102e-102h of FIG. 3 provide a zone that provides optimized steam and catalyst distribution.

Figure 4A:
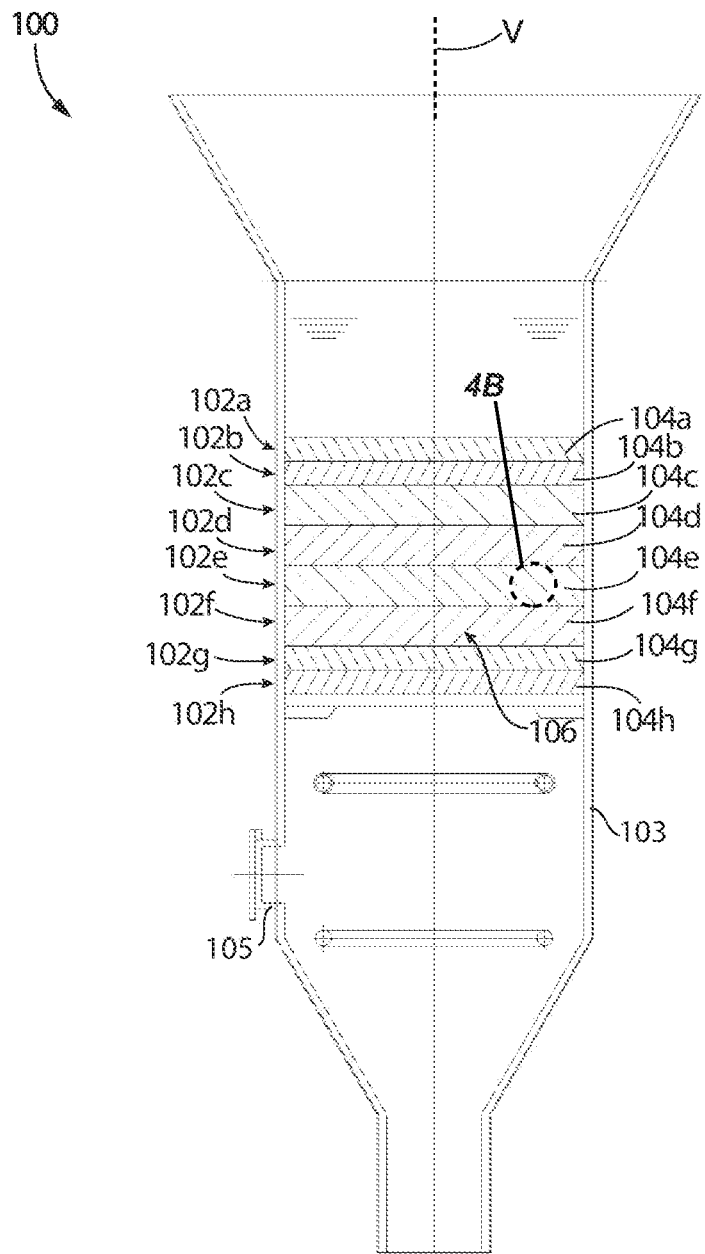
FIG. 4A is a schematic side view of a FCC stripper vessel having a packing system constructed in accordance with another embodiment of the present disclosure, showing a plurality of packing element layers.
Figure 4B:
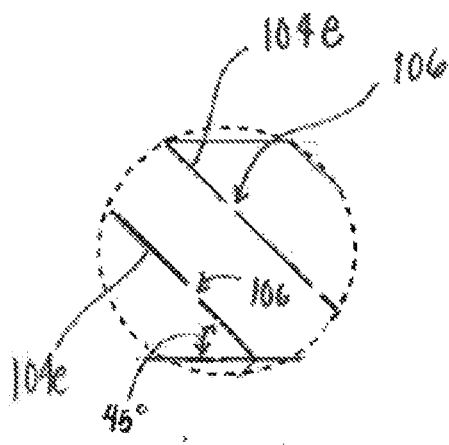
FIG. 4B is a schematic side view of a portion of the FCC stripper vessel of FIG. 4B, showing a plurality of blades with slots.

Stripping efficiency is also a function of residence time. FIGS. 4A-4B shows the third, fourth, fifth and sixth layers 102c-102f (e.g. the more open layers) having blades 104c-104f with angles of inclination of 45° (which is a shallower blade angle compared to normally used 60° blades) and holes 106. Shallower inclined blades 104c-104f of FIG. 4A increase the effective residence time and steam catalyst contact area, and holes 106 in the blades 104c-104f promote steam catalyst interaction and avoid premature stripper flooding. FIG. 4A shows a first zone including the first and second layers 102a and 102b where each layer 102a and 102b is similar in structure to one another with respect to blade size and spacing, but has blades 104a and 104b at opposite angles. Blades 104a and 104b of FIG. 4A are at a steeper angle of inclination than blades 104c-104f of FIG. 4A, e.g. blades 104a and 104b can be at an angle of inclination of approximately 60°, meaning that they are angled downward relative to vertical axis V by about 30°. Even though blades 104a and 104b of FIG. 4A are at opposite angles relative to one another, their angle of inclination relative to vertical axis V is the same. A second zone of FIG. 4A includes third, fourth, fifth and sixth layers 102c-102f, respectively, where layers 102c-102f are of a similar structure to one another with respect to blade size and spacing, but has blades 104c and 104d at opposing angles and blades 104e and 104f at opposite angles. The tighter-packed blades 104a-104b of packing layers 102a and 102b of FIG. 4A provide a zone that provides optimized catalyst distribution. The increased spacing between blades 104c-104f, the varying blade angle, and the holes 106 of blades 104c-104f (shown in FIG. 4B) are optimized for better fluidization and increased residence time throughout layers 102c-102f of FIG. 4A. A third zone of FIG. 4A is formed by the seventh and eight layers 102g-102h, respectively, and includes tighter packed blades 104g-104h and provides optimized steam distribution.

The multi-zone designs of FIGS. 1-4B allow layout to be optimized to achieve improved stripping efficiency and improved fluidization. The embodiments of packing system 100 disclosed herein improve efficiency in the FCC stripper by optimizing the internals configuration. This is achieved by splitting the stripper bed internals into two or more different zones with specifically sized packing elements (blades) or devices. Those skilled in the art will readily appreciate that while FIGS. 1-4B are described as including rectangular planar blades arranged in an annular shape in stripper vessel, a a variety of suitable shapes for blades can be used for various layers.

Generally, most of the stripping takes place in the top section of the bed, where inter-particle vapors are displaced relatively easily and some inner-particle vapors are also removed. This area is relatively easy to fluidize due to the high vapor loading. As catalyst flows down through the bed, efficacy of stripping, per unit of bed height, decreases exponentially. Lower in the bed hydrocarbons trapped in the catalyst particles have to be removed which will require more efficient contact between the stripping steam and catalyst. The embodiments of system 100 disclosed herein utilize multiple zones of different packing sizes (or type of internal) to optimize catalyst/vapor contact. In general, tighter packing elements (e.g. layers 102a-102b and 102g-102h of FIG. 1) are used for intensive mixing and stripping. More open and loose packing elements (e.g. in layers 102c-102f of FIG. 1) are used for fluidization.

As shown in FIGS. 5A-6B, packing system 200 utilizes multiple blade widths in a given layer (e.g. intra-layer variation) to provide more even gas catalyst flow distribution across the catalyst bed. This variation in width is especially helpful for FCC stripper systems having asymmetric spent catalyst standpipe (SCSP) arrangements. Many FCC units use a generally cylindrical stripper vessel 203 where catalyst is drawn off from the side of the vessel 203 at an outlet 205, this creates an asymmetric catalyst flow pattern within the vessel 203 and packing layers which is then amplified by the configuration of the elements/blades within the packing section. Vessel 203 can be similar to vessel 103 of FIG. 4A. Traditional packing systems maintain an open path in only one lateral direction at each layer, subsequent layers are rotated with respect to each other to try and achieve some lateral uniformity. In system 200, at each layer the open nature of the device maintains a laterally open path in all directions which should minimize any channeling tendency. The multi-width blades 204a and 204b, described in more detail below, are arranged in a packing element layer 202 to ensure no flow mal-distribution or preferential channeling occurs in the bed. Improved gas catalyst flow distribution results in reduced steam entrainment and improved stripping efficiencies due to better steam utilization.

With reference now to FIGS. 5A-6B, a packing element layer 202 in packing system 200 includes a blade configuration which directionally forces more catalyst flow from the SCSP side stripper wall (e.g. the wall proximate to the inlet 205) to the center and, at the same time, promote more catalyst flow from wall opposite to the SCSP towards the center. System 200 can also include one or more layers 102a-102h of system 100 as shown in any of FIGS. 1-4B. In the standard blade configuration, the width of the blades pointing down in either direction (East-West or North-South) is the same, resulting in equal catalyst flow distribution on each side of blade within the layer (e.g. 50% of the catalyst in one direction and 50% of the catalyst in the other, which can be seen by the schematic depiction of the south portion of a second layer 201 in FIG. 5A. The North, South, East and West directions are indicated by N, S, E and W labels in FIGS. 5A and 6A. In the embodiments of FIGS. 5A-6B, for at least one of the layers in the packing system 200, the width of the blades 204a and 204b in each direction is different than the adjacent layers.

Figures 5A, 5B:
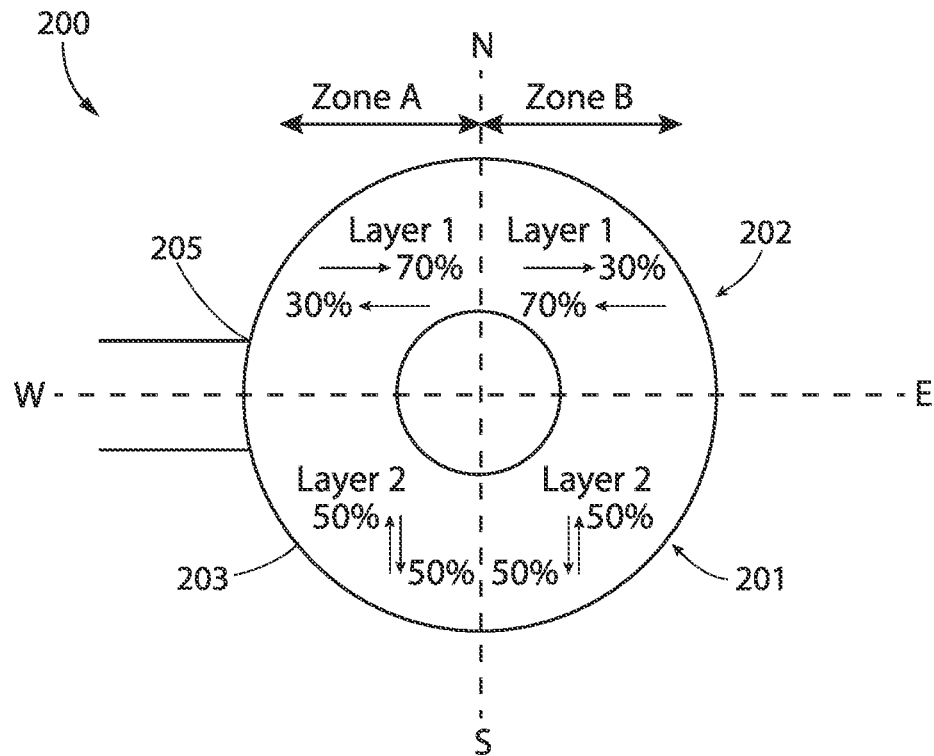
FIG. 5A is a schematic diagram of a top view of a packing system constructed in accordance with another embodiment of the present invention, diagrammatically showing the blade direction and blade width/flow distribution for two vertically stacked layers, where the first layer includes two zones having variable blade widths and the second layer (below the first layer) includes blades having the same blade width.
FIG. 5B is a chart depicting the blade direction and breakdown of blade width/flow distribution for additional layers of the system of FIG. 5A.

As shown in FIGS. 5A-5B, each layer, e.g. layers 201 or 202, can have an overall annular shape and there can be a variety of number of layers. In the embodiment of FIG. 5B, there are eight layers total, some similar to the first layer 202 and some similar to the second layer 201. The eight layers are arranged in alternating vertical configuration such that the first and third layer are the same (with varying width blades within each layer, like layer 202) and the second and fourth layers are the same (with constant width blades within each layer, like layer 201). This is shown by the table of FIG. 5B and the ratio of blade widths provided (70/30 for variable widths and 50/50 for constant width blades).

Figure 6A:
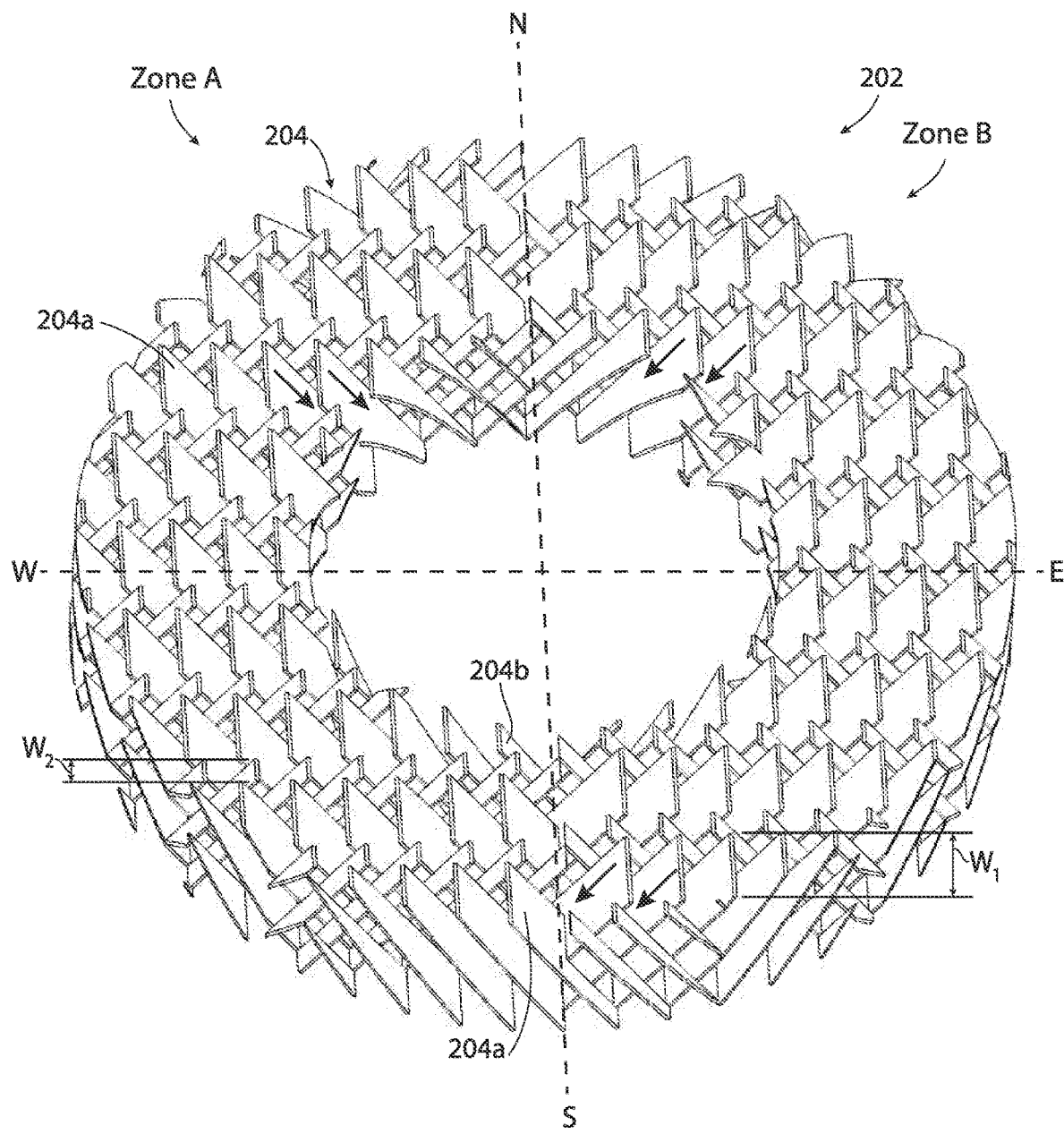
FIG. 6A is a schematic perspective view of layer one of FIG. 5A, showing the blades of the layer having non-uniform (variable) blade width across each zone within the layer.
Figure 6B:
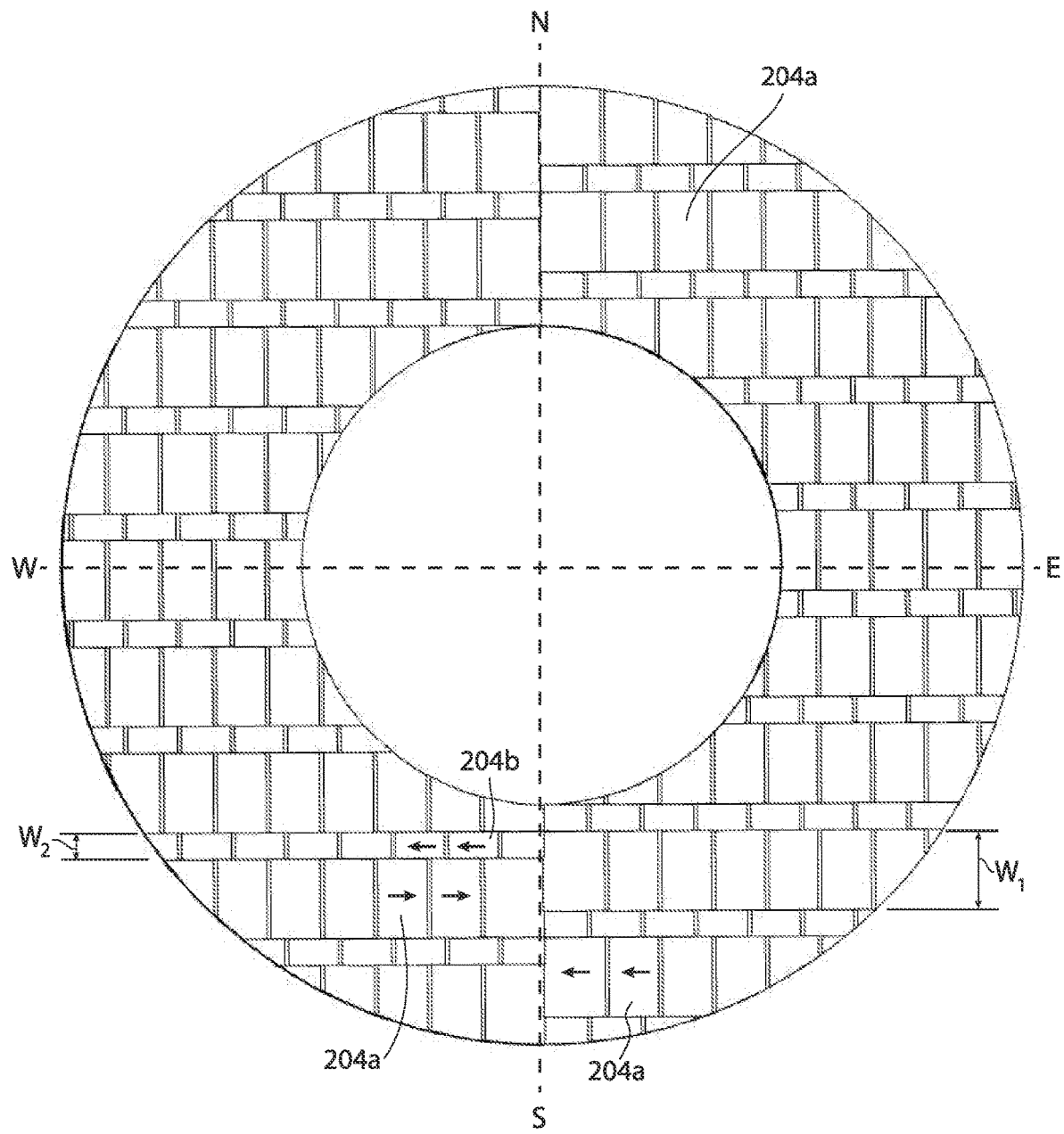
FIG. 6B is a schematic top view of the layer of FIG. 6A, showing the blades of the layer having non-uniform (variable) blade width across zones of the layer.

As shown in FIGS. 6A-6B, blades 204 of the first packing element layer 202 include a first set of blades 204a having a first width $W_1$ and a second set of blades 204b having a second width $W_2$, wherein the second width $W_2$ is narrower than the first width $W_1$. The first set of blades 204a includes two groups of blades (those in Zone A and Zone B). A first of the two groups, e.g. blades 204a in Zone A, is arranged at a first angle and a second of the two groups, e.g. blades 204b in Zone B, is arranged at a second angle. The first and second angles are arranged at opposite angles relative to one another. In other words, the angle of inclination relative to a vertical axis of the vessel 203 is the same, but some blades 204a slant downwards from west to east and others slant downwards from east to west. Second set of blades 204b includes two groups of blades.

With continued reference to FIGS. 6A-6B, a first of the two groups, e.g. blades 204b in Zone A, of the second set of blades 204b are arranged at a third angle and a second of the two groups, e.g. blades 204b in Zone B, of the second set of blades 204b is arranged at a fourth angle. The third angle and the fourth angle are at opposite angles. The first angle is opposite from the third angle. For example, if the typical blade width is 5 inches, then as shown in FIG. 6A, Zone A (the north- and south-west quadrants) can have 7 inch blades 204a pointing down in east direction (as indicated schematically by the directional arrows on plates 204a) and 3 inch blades pointing downward in the east to west direction. On the other hand, Zone B (the north- and south-east quadrants) will have 3 inch blades 204b pointing downward in the west to east direction and 7 inch blades 204a pointing downward in the east to west direction (as indicated schematically by the directional arrows on blades 204a). The wider blades 204a will allow increased percentage of catalyst flow in that direction (as schematically shown by the directional arrow on the upward facing surfaces of the blades 204a). This will help divert more catalyst flow from SCSP stripper side, e.g. the west side, towards the center and at the same time, promote more catalyst flow from the wall side opposite to the SCSP, e.g. the east side, towards the center.

Those skilled in the art will readily appreciate that that blade width is not limited to three or seven inches, those dimensions were provided only to illustrate an example. Additionally, blade spacing can be altered in Zones A and B depending upon the requirement, such as loose packing in Zone B (similar to blades 104c of FIG. 1) for more free flow, and tight packing (similar to blades 102a of FIG. 1) in Zone A for more intense mixing and stripping. The wider spacing will have less flow resistance and less channeling of gas pockets underneath the blades.

The embodiments of FIGS. 5A-6B provide improved flow distribution and reduced channeling, as compared with conventional packing systems, which tends to improve stripper performance and steam utilization, and reduce steam consumption. System 200 provides lower cost due to increased spacing, requiring less packing per unit volume, uniform pressure head in stripper and increased pressure head in stand pipe, and better stripping, which reduces regeneration temperature and increase catalyst circulation and improve product yields.

Figure 7:
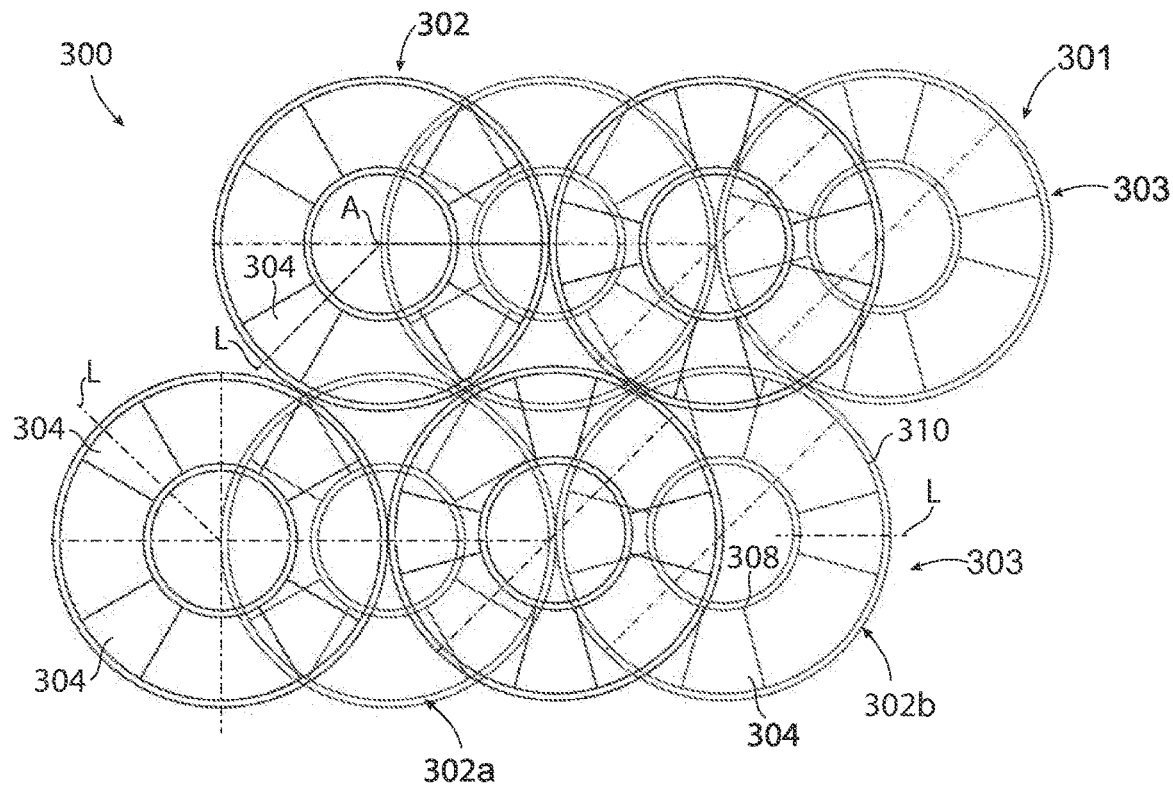
FIG. 7 is a schematic top view of a portion of a packing system constructed in accordance with another embodiment of the present disclosure, showing frustoconical packing elements.
Figure 8:
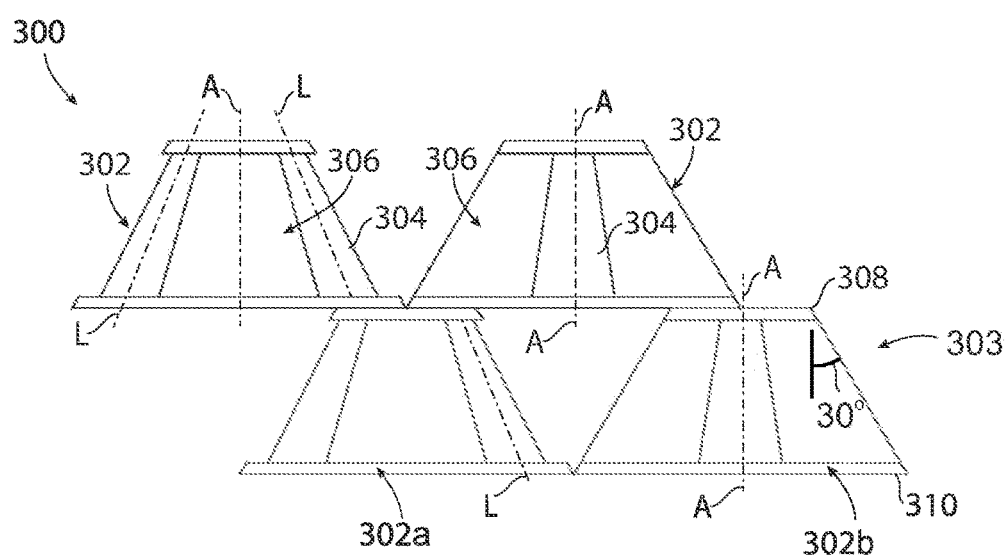
FIG. 8 is a schematic side view of the packing system of FIG. 7, showing frustoconical packing elements.

As shown in FIGS. 7-8, a packing system 300 is directed to tapered element designs to improve FCC stripper operation. Packing system 300 can be used in a vessel like that of 103 of FIGS. 1-4B, or the like. Hollow tapered packing elements/bodies 302 are shown as frustoconical bodies 302. As described below, hollow tapered packing elements/bodies 302 utilize a multi-directional arrangement with significantly less "blade" count to improve stripping efficiency, improve head build up and reduce steam usage; as well as stripper packing design that provides for easy variation of packing blade height, width and angle. Packing system 300 includes a plurality of hollow frustoconical bodies 302, wherein each frustoconical body 302 abuts at least one adjacent frustoconical body 302 to facilitate contact between solids and fluids in a fluidized bed. The frustoconical bodies are welded together for form the structure shown in FIGS. 8 and 11A. The open, frustoconical, body 302 provides the required tortuosity and bubble formation points required to ensure intimate mixing of the steam/catalyst. The surfaces forming the device are relatively short and narrow thus minimizing the potential for phase separation at the device itself. Packing system 300 uses a multi-directional arrangement with significantly less "blade" count to improve stripping efficiency, improve head build up and reduce steam usage. The frustoconical bodies, e.g. elements 302, accomplish this by ensuing catalyst flowing down through the stripper bed is evenly distributed. Up-flowing stripping steam vapor will have a comparatively higher bubble count and will also maintain uniform distribution. This maximizes the surface area for mass transfer and so will provide for excellent stripping performance.

Packing system 300 with packing elements 302 is designed to reduce the channeling mechanism as well as the tendency of localized phase separation around the surfaces of the element, with reduced blade count, and incorporation of random blade orientation. Hollow tapered packing elements/bodies 302 also distribute the catalyst more evenly radially into the packing elements below. Frustoconical packing elements 302 reduce weight and therefore less support is required. Moreover, the metal required per unit volume is reduced, and the frustoconical shape, generally, is structurally stronger, thereby requiring less thickness in the material forming the frustoconical packing elements. The more open design results in improved pressure build-up, and 360° lateral openness results in a more uniform distribution and less tendency to channel.

With continued reference to FIGS. 7-8, each frustoconical body 302 includes slots 306 positioned around the perimeter of the body 302. Each frustoconical body includes a plurality of longitudinally extending ligaments 304 positioned between each slot 306. Each of the longitudinal extending ligaments 304 extends between a top edge, e.g. a top ring 308, of the frustoconical body 302 and a bottom edge, e.g. a bottom ring 310, of the frustoconical body 302. Each body 302 can include a plurality of ligaments, e.g. 4-6 ligaments, covering about 30-50% of the conical perimeter, or another suitable number. The top and bottom rings 308 and 310, respectively are open to allow flow therethrough.

As shown in FIG. 7, each ligament 304 of a given frustoconical body 302 defines a ligament axis L in a perimeter of the frustoconical body 302. When projected on to a plane perpendicular to a longitudinal axis A of their respective frustoconical body 302, the ligament axes L for one frustoconical body 302 are not parallel to the axes L for an abutting frustoconical 302 body in the same row 303. In other words, the ligaments 304 of abutting frustoconical bodies 302 in the same row are not aligned. The conical bodies in a given row are rotated relative to one another such that, for example, a first conical body 302a has ligaments arranged at 0°, 90°, 180°, and 270° (relative to an axis perpendicular to axis A), while a second conical body 302b abutting the first has ligaments arranged at 45°, 135°, 225° and 315°. The angle of the frustoconical body is such that catalyst will freely flow over it. For example, each ligament axis L is angled at about 30° to 45° relative to its respective longitudinal axis A. The ligament width is minimized and a variety of number of ligaments 204 can be used (3, 4, 5, 6 etc.) depending on the application. The open nature of the frustoconical element/body 302 will allow free movement of the gas and catalyst but at the same time prevent vertical channeling due to the vertical tortuous path the phased will be forced into, e.g. as the catalyst flows down ligaments 304 of one frustoconical body 302, the vertical flow is interrupted by the top ring 308 or bottom ring 310 of the frustoconical body below. Any large agglomerations of either phase will be quickly forces to split and move vertically.

Figure 9:
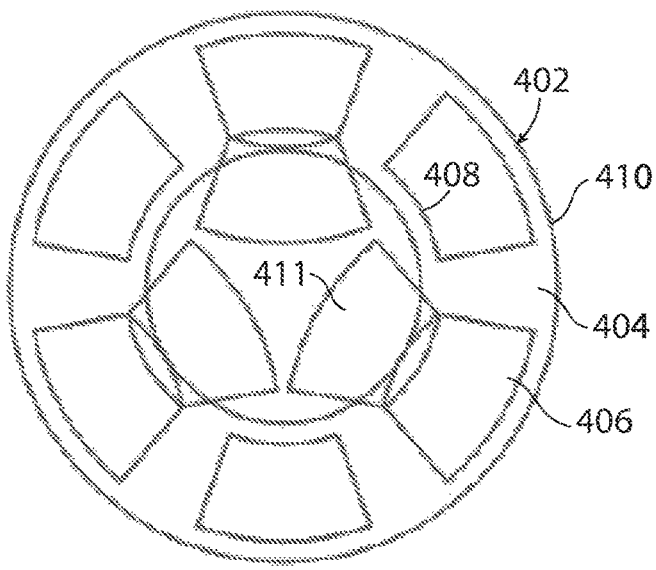
FIG. 9 is a schematic top view of a portion of a packing system constructed in accordance with another embodiment of the present disclosure, showing a frustoconical packing element with bent in tabs.

As shown in FIG. 9, another embodiment of a tapered body 402 is shown. Tapered body 402 similar has a frustoconical shape and includes slots 406 and ligaments 404 similar to frustoconical body 302, except that the material cut out to form the slots 406 is not fully cut out and at least some of the material cut out for a given slot 406 is bent inward to form a tab 411 to enhance the mixing effect of the catalyst and steam.

Figure 10A:
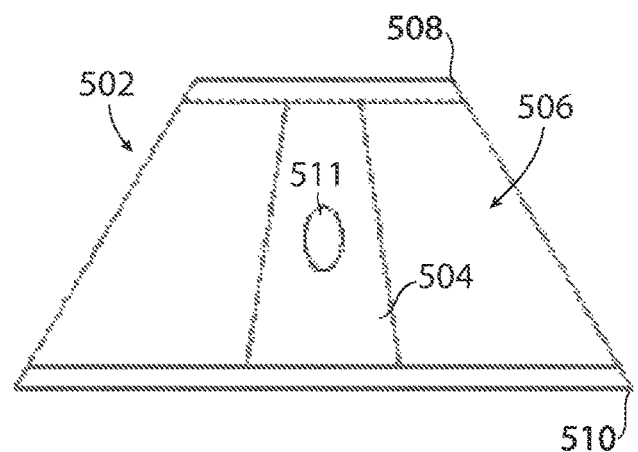
FIG. 10A is a schematic side view of a portion of a packing system constructed in accordance with another embodiment of the present disclosure, showing a frustoconical packing element with ligaments having holes therein.
Figure 10B:
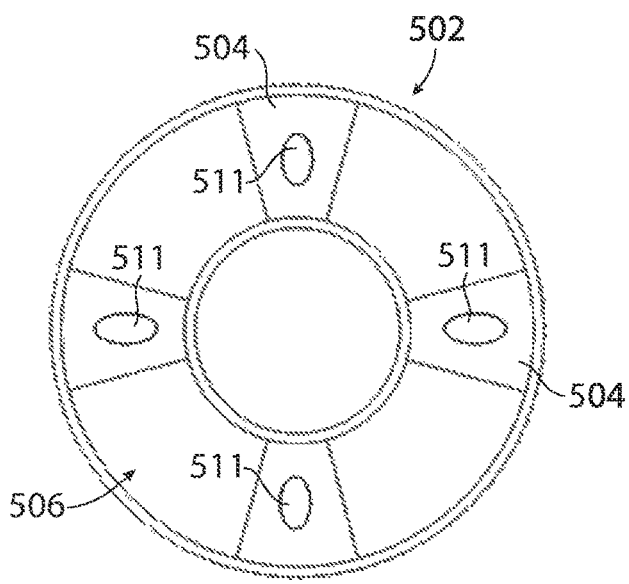
FIG. 10B is a schematic top view of the packing system of FIG. 10A, showing a frustoconical packing element with ligaments having holes therein.
Figure 11A:
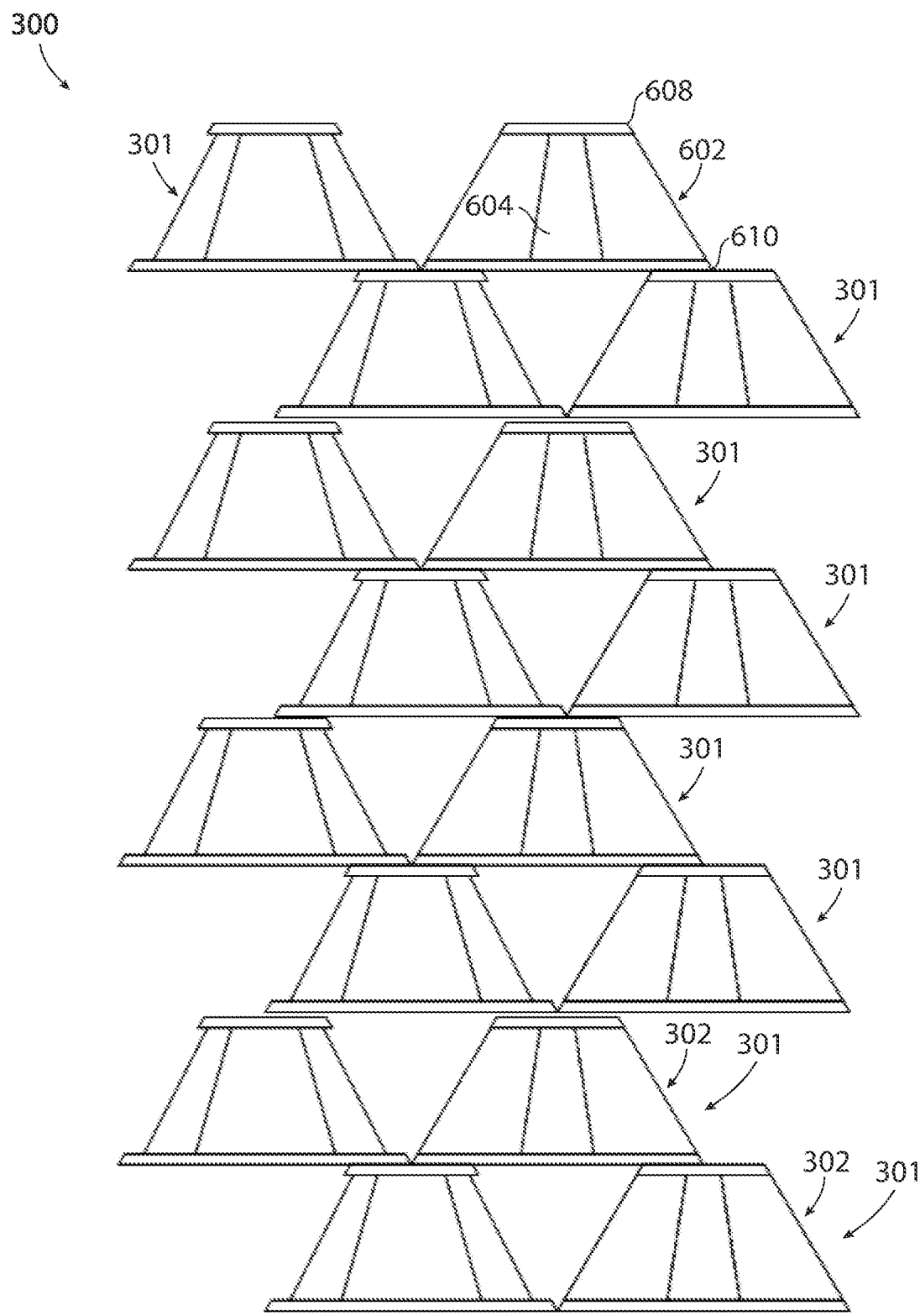
FIG. 11A is a schematic side view of the packing system of FIG. 7, showing a top layer of frustoconical packing elements with closed top surfaces.
Figure 11B:
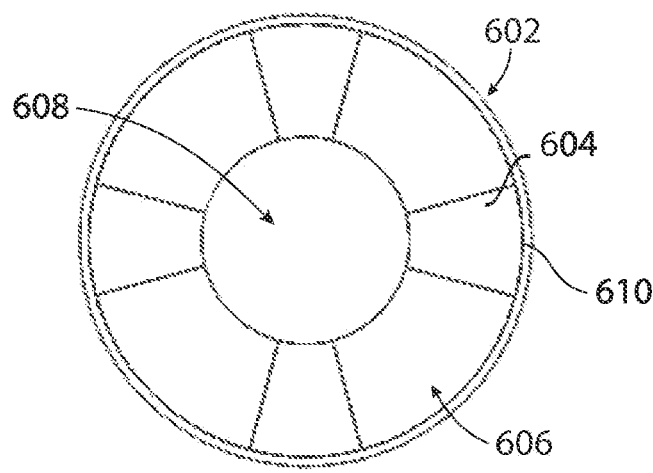
FIG. 11B is a schematic top view of a portion of a packing system constructed in accordance with another embodiment of the present disclosure, showing a frustoconical packing element having a closed top surface.

As shown in FIGS. 10A-10B, another embodiment of a hollow tapered body 502 is shown. Body 502 is similar to 302 in that it is frustoconical shaped and includes slots 506 and ligaments 504, except that at least one of the ligaments 504 include holes 511 to further reduce weight and improve bubble formation.

As shown in FIGS. 7-8 and 11A-11B, one or more of frustoconical bodies 302/402/502 are arranged in layers 301 having rows 303 of bodies 302 which are stacked on top of one another and welded together to form a structurally repeating packing system 300. To improve the initial distribution of catalyst into the packed section, a top layer 301 of elements have closed tops. These tapered/frustoconical bodies are designated by numeral 602. Frustoconical bodies 602 are similar to frustoconical bodies 302 in that they have openings 606, ligaments 604 and a bottom ring 610, except that frustoconical bodies 602 have a closed top 608 instead of an open top ring 308. Closed top 608 can be in the form of a disc shape. This additional resistance to catalyst flow will drive better distribution. Additionally, at selective levels within the packing system 300 some individual elements 302/402/502 may have closed tops, similar to closed top 608, or partially closed tops. These intermediate restrictions will serve as additional redistribution devices.

As described above compared to conventional packing design the tapered elements will improve uniformity of fluidization, provide for better distribution at the inlet and within the bed, increase bubble formation/splitting within the bed. Flow path tortuosity is increased but not at the expense of increased resistance to flow (i.e. pressure drop). Other benefits of the embodiments herein include: improved distribution within the packing (uniform flux of solids in the active stripping area) promotes radial distribution, improved contact with the media, potential reduction in stripping media required, significantly less blades results in a more open design, significantly reduced probability of vapor/catalyst channeling, bubble breakage promoted as steam flows up the stripper, improved head build up to less blades to support the catalyst mass, inherent strength of the frustoconical body resulting in less material required, weight reduction, and reduced cost, increased product recovery, and reduced coke.

Figure 12:
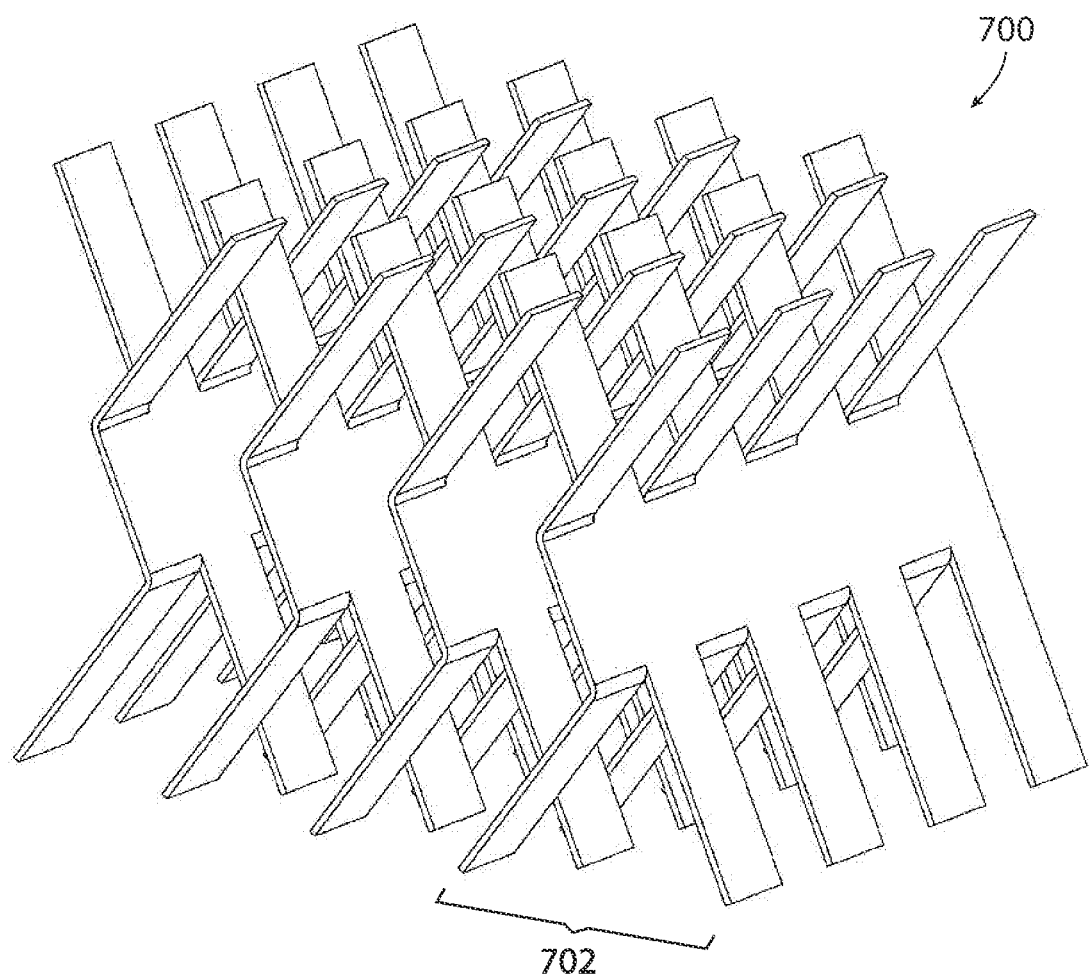
FIG. 12 is a schematic perspective view of a portion of a packing system constructed in accordance with another embodiment of the present disclosure, showing a plurality of packing elements.
Figure 13:
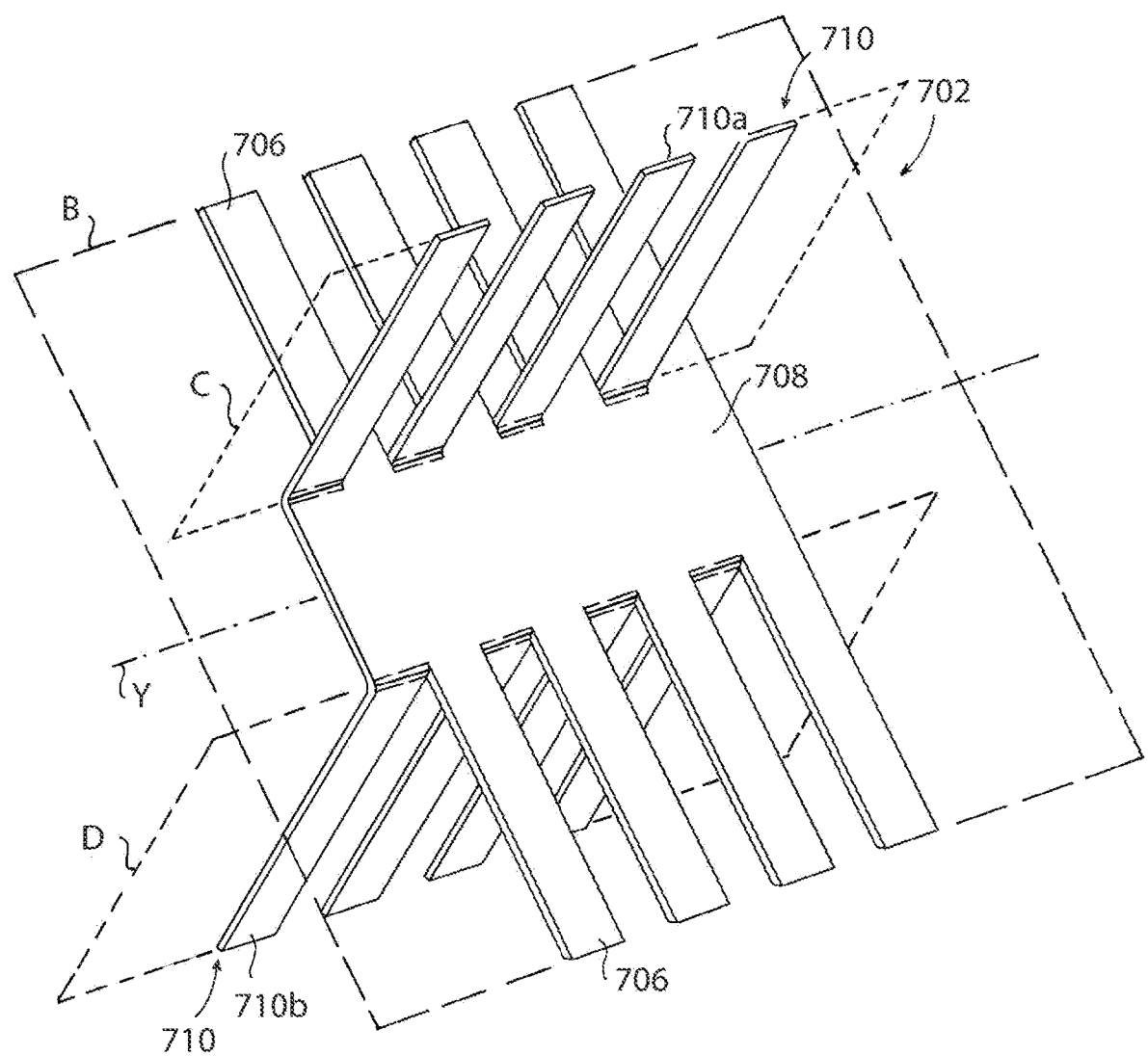
FIG. 13 is a schematic perspective view of a portion of the packing system of FIG. 12, showing the blades of one of the packing elements.
Figure 14:
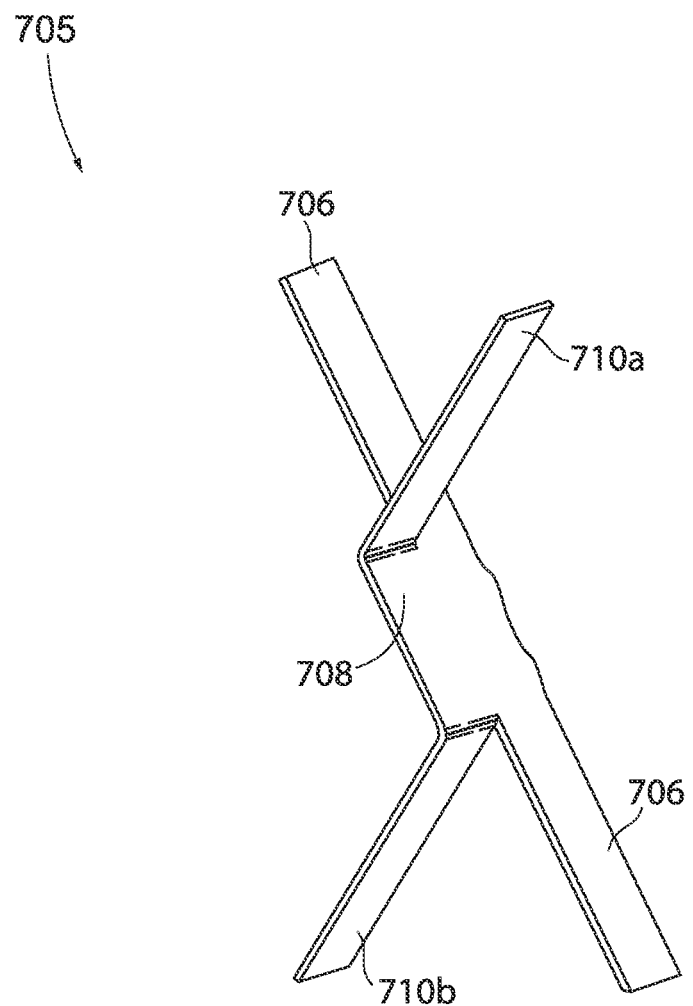
FIG. 14 is a schematic perspective view of a portion of the packing system of FIG. 12, showing the blades of one of the packing elements.

As shown in FIGS. 12-20, packing system 700 includes a plurality of packing elements 702 formed by a series of blade bodies 705. With reference to FIGS. 12-14, each packing element 702 defines a longitudinal axis Y and is configured to facilitate contact between solids and fluids in a fluidized bed. Each packing element 702 defines an element plane B. Each packing element 702 includes a plurality of primary blades 706 extending from a common cross bar 708 defined parallel to the longitudinal axis Y, and a plurality of additional blades 710. Some of additional blades 710a extend in a first secondary plane C and the additional blades 710b opposite from additional blades 710a across the cross-bar 708 extend in a second secondary plane D. First and second secondary planes C and D are parallel to and offset from one another. Primary blades 706 are defined within and parallel to the element plane B. The secondary planes C and D are not parallel to the element plane B. In the embodiment of FIGS. 12-13, secondary planes C and D are oblique to element plane B. A blade body 705, as shown in FIG. 14, is considered to include two primary blades 706 extending from opposite sides of cross-bar 708 and two additional blades 710a and 710b extending from opposite sides of cross-bar 708. Together, the four blades form an "X" shaped blade body with an off-set between two legs, e.g. blades 710a and 710b, of the "X."

Figure 15:
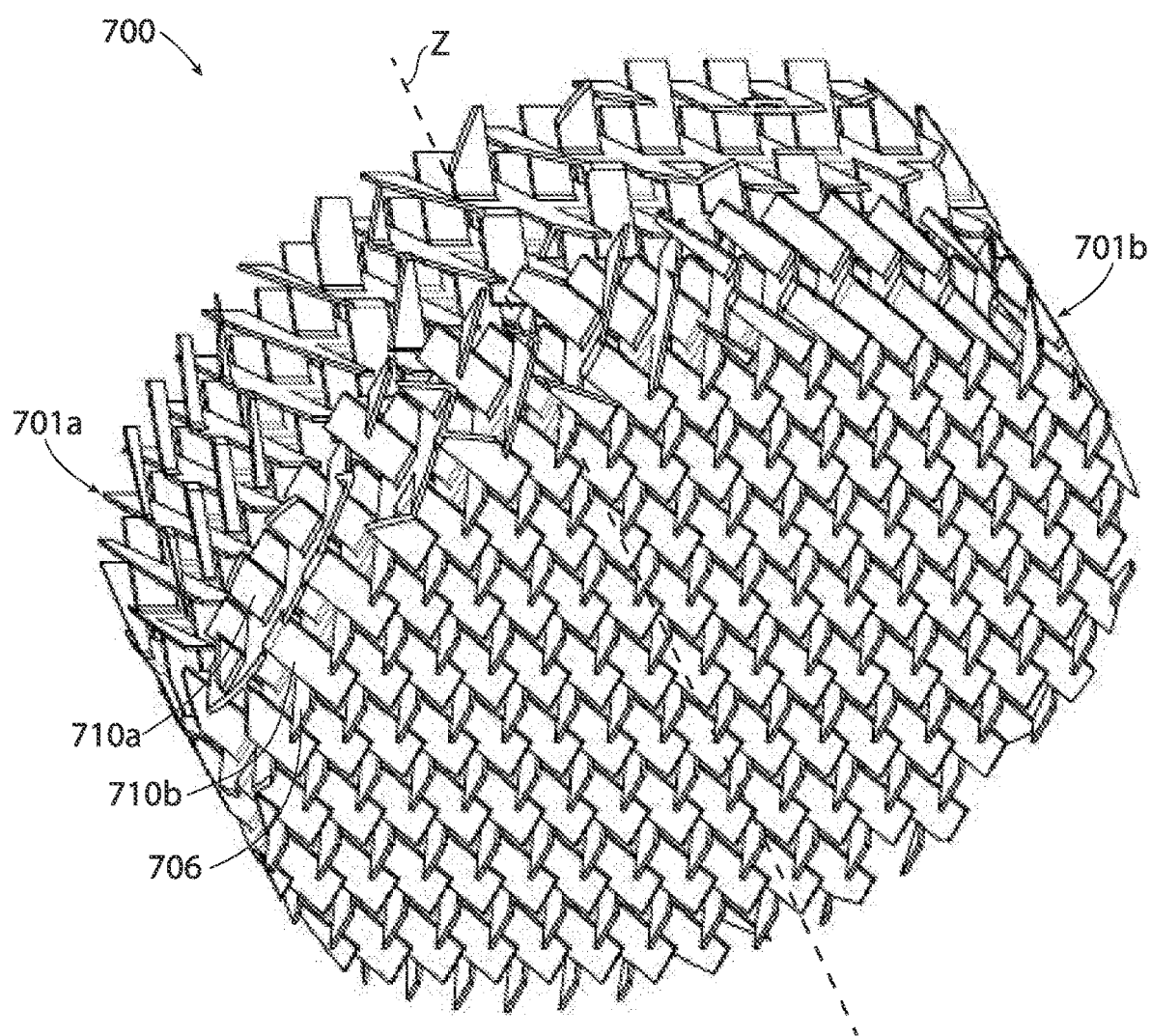
FIG. 15 is a schematic perspective view of a packing system constructed in accordance with FIG. 12, showing two layers of packing elements.
Figure 16A:
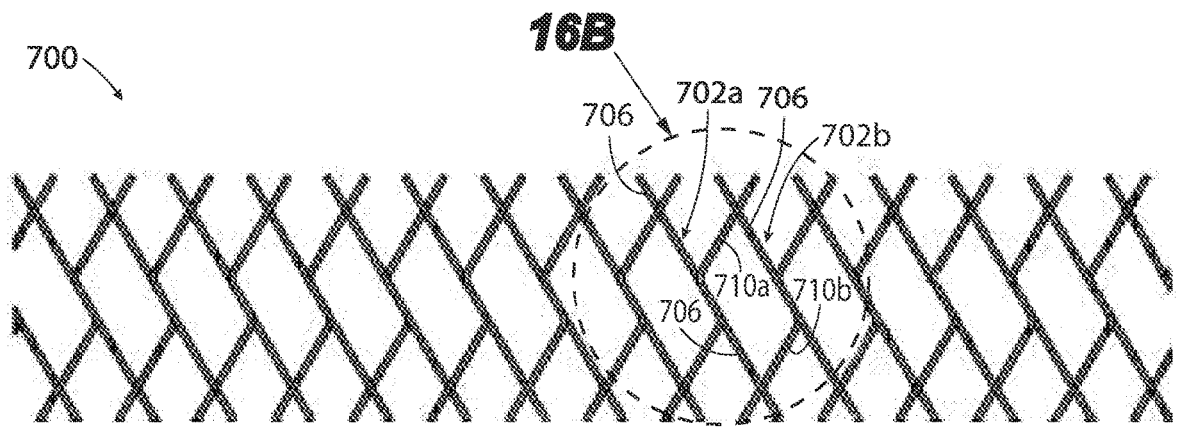
FIG. 16A is a schematic side view of a portion of the packing system of FIG. 15, showing a plurality of packing elements.
Figure 16B:
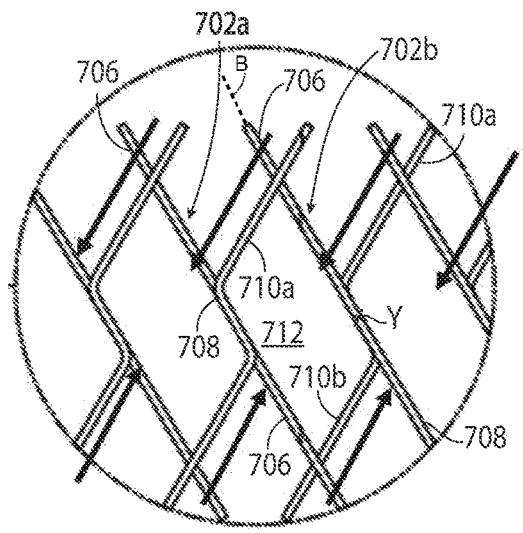
FIG. 16B is a schematic side view of a portion of the packing system of FIG. 15, showing adjacent packing elements having overlapping blades.
Figure 16C:
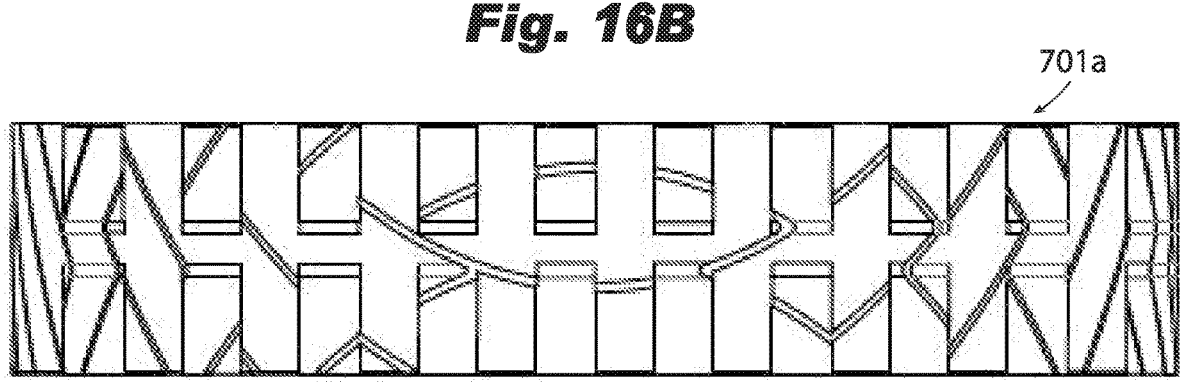
FIG. 16C is a schematic front view of a portion of the packing system of FIG. 15, showing the blades of one of the packing element layers with cut lines after forming the perimeter of the packing system into a rounded shape.

With reference now to FIGS. 15 and 16A-16C, system 700 includes a plurality of packing elements 702 arranged in parallel where one of the additional blades 710a of the first packing element 702a intersects element plane B of a second 702b of the two packing elements. Packing elements 702 are arranged in a layer 701a. Element plane B of second packing element 702b is not shown in FIG. 16A for sake of clarity, but would be defined parallel to and aligned with primary blade 706 of second packing element 702b. The two packing elements 702a and 702b form a mixing chamber 712. The mixing chamber 712 is defined between one of the primary blades 706, a cross-bar 708, and additional blade 710a of first 702a of the two packing elements and one of the primary blades 706, cross-bar 708, and additional blade 710b of a second 702b of the two packing elements. The shape of mixing chamber 712, when projected on a plane perpendicular to a longitudinal axis Y of the first packing element, e.g. as shown in FIG. 16B, is a parallelogram. As shown in FIG. 16B, as catalyst flows downward (indicated schematically by the downwardly angled arrows) along an additional blade 710a of packing element 702b (and between two primary blades in the foreground and background) it is directed into the mixing chamber 712. At the same time, steam or other vapor rising upwards (indicated schematically by the upwardly angled arrows of FIG. 16B) is guided by additional blade 710b of the first packing element 702a into the mixing chamber 712. This promotes mixing of the vapor and catalyst.

As shown in FIG. 19, each packing element 702 is formed from a unitary material sheet. 703. The unitary material sheet is cut on a laser or plasma bed along lines 716 that define the additional blades 710. Once cut, or concurrently therewith, each of the additional blades is bent along a respective bend line 715. The bending is schematically shown by the arcuate arrows about bend lines 715. Bending can be performed with a press break machine. Each packing element 702, and, therefore, the packing system 700 overall, is also easier to manufacture because it is made entirely of a plate 703 which can be cut to shape on a laser or plasma bed and bent with a press break. There are no complex welding or bending operations as are necessary with other traditional packing system designs.

Figure 17:
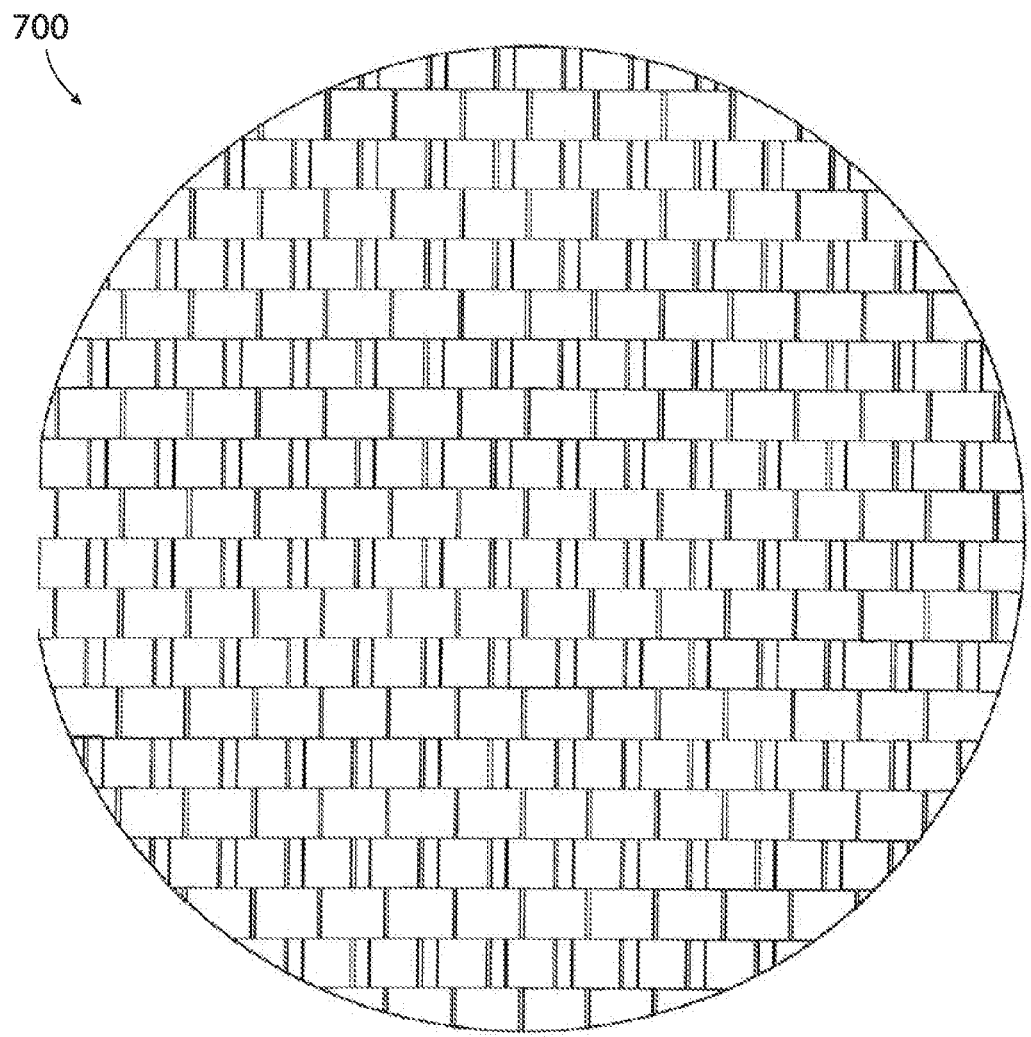
FIG. 17 is a schematic top view of a portion of the packing system of FIG. 15, showing the top side of a layer of packing elements.
Figure 18A:
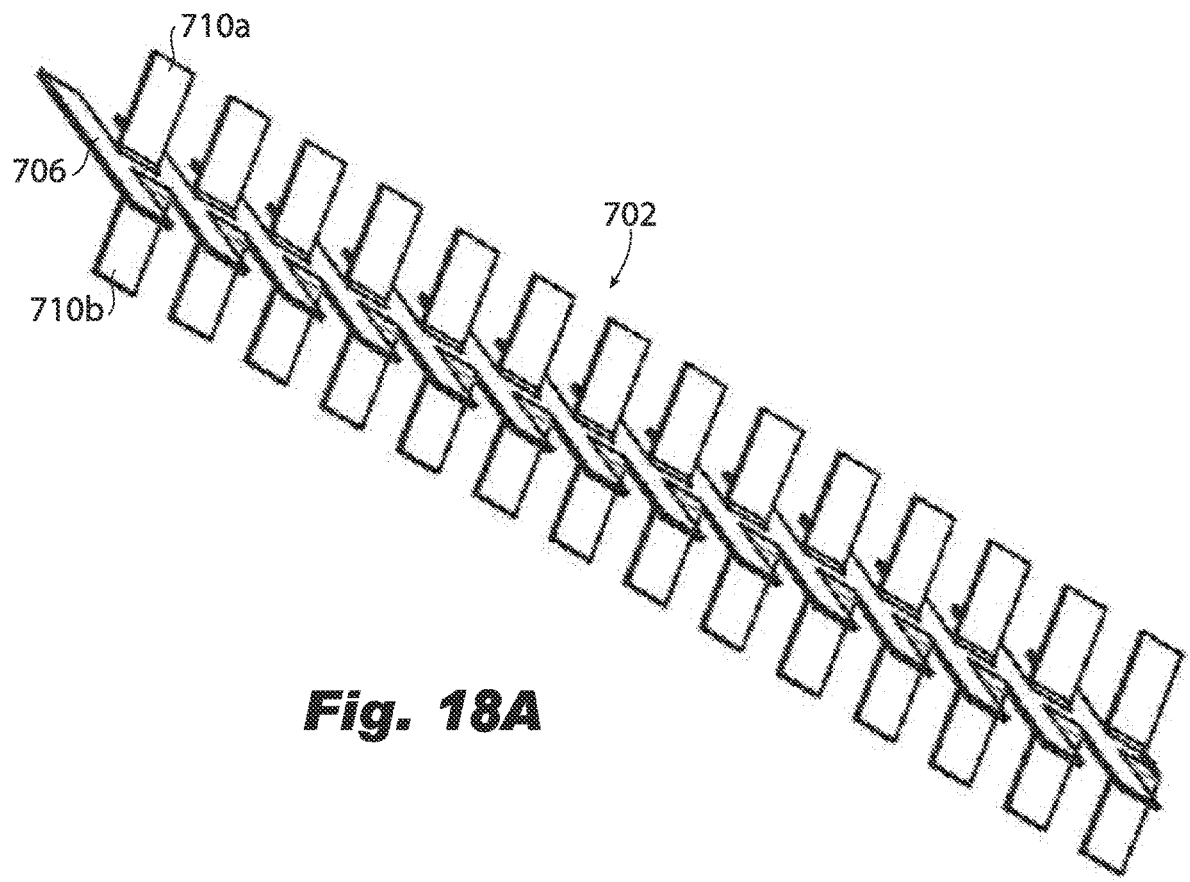
FIG. 18A is a schematic perspective view of a portion of the packing system of FIG. 15, showing one of the packing elements after bending.
Figure 18B:
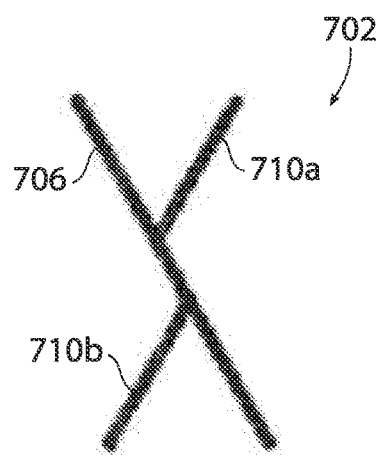
FIG. 18B is a schematic side view of a portion of the packing system of FIG. 15, showing a single "blade" of one of the packing elements after bending.
Figure 20:
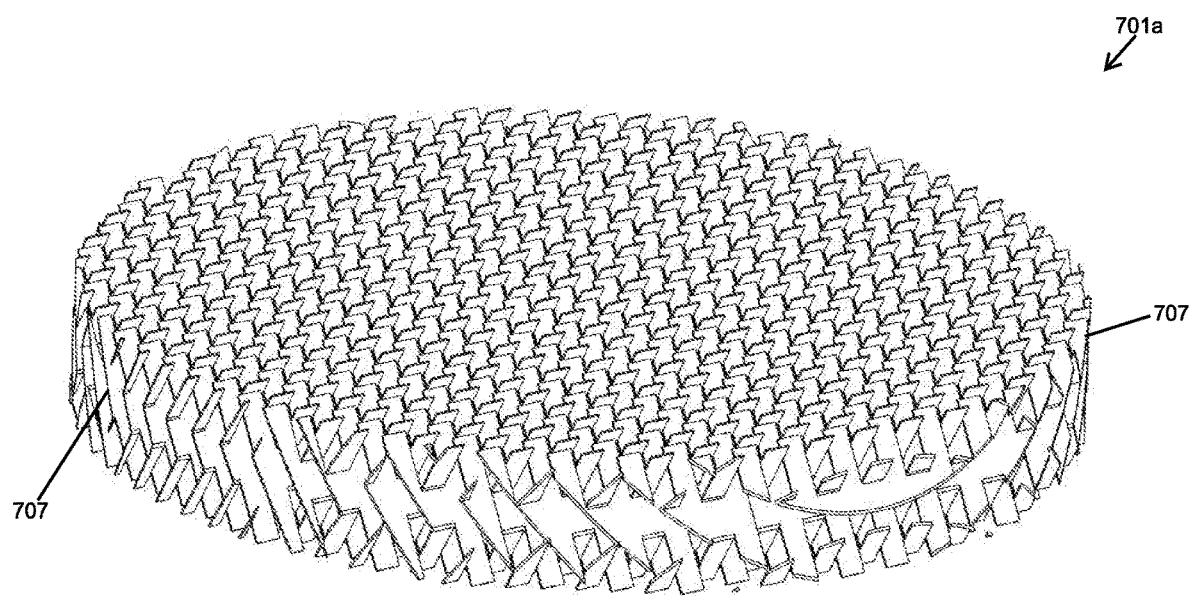
FIG. 20 is a schematic perspective view of a packing system constructed in accordance with FIG. 12, showing one layer of packing elements.

As shown in FIGS. 15-17, once each packing element 702 is bent and welded (or otherwise secured) together with other elements, the elements can be formed into a layer 701a or 701b having a cylindrical or annular shape. Each packing element 702 can be welded with adjacent elements to form a longer element 702, if needed. Each element 702 forms a row within layers 701a and 701b. Ends 707 of the element 702 rows can be welded to a securing perimeter band or the like to form layers 701a and 701b, or the rows of elements 702 can be welded directly to one another where their blades cross a common plane, e.g. blade 710a of one element 702 can be welded to blade 706 of an adjacent element 702 where additional blade 710a crosses element plane B of the adjacent element 702. These layers 701a or 701b can be vertically stacked together, as shown in FIG. 15. The first and second layers of the packing system define a vertically oriented axis Z parallel to an overall vapor flow direction. The element planes B of each packing element 702 in both the first and second layers 701a and 701b of the packing system are oblique with respect to the vertically oriented axis Z. Layers 701a and 701b are rotated relative to one another such that the respective cross-bars 708 of layers 701a and 701b are angled relative to one another. With reference now to FIG. 20, a single layer 701a is shown. Layer 701a is similar to that of layer 701a of FIGS. 15-17 except that it includes more rows of packing elements 702.

Embodiments of the present disclosure are directed to improved stripper packing design disclosed herein allow easy variation of packing blade height, width and angle. The packing minimizes (or outright eliminates) vertical and horizontal surfaces. The vertical surfaces provide no contacting benefit and the horizontal surfaces only increase the chance of plugging. The embodiments of the present disclosure contemplate making it easier to vary the blade height, width and angle so that it can be optimized. It is also easier to manufacture with less parts.

The results described hereinabove reflect the advantages of the stripping system according to the embodiments described herein. In particular, the improved contact between gaseous fluid and catalyst particles within the structured packing system result in reduced hydrocarbon entrainment. It is to be understood that the embodiments disclosed herein defined by the appended claims is not to be limited by particular details set forth in the above description as many apparent variations thereof are possible.

What is claimed is:

1. A packing system comprising:
   a first packing element layer including a plurality of blades; and
   a second packing element layer including a plurality of blades, wherein the packing system includes at least one of intra-layer variation or inter-layer variation, wherein intra-layer variation includes at least one of (i) varying spacing between blades within at least one of the first packing element layer or the second packing element layer, (ii) varying sizes of the blades within at least one of the first packing element layer or the second packing element layer, or (iii) varying angle of inclination of the blades within at least one of the first packing element layer or the second packing element layer, and wherein inter-layer variation includes the blades of the first packing layer having a first spacing, a first size, and a first angle of inclination and the blades of the second packing layer having a second spacing, a second size, and a second angle of inclination, wherein at least one of the second spacing, the second size, or the second angle of inclination is different from at least one of the first spacing, the first size, or the first angle of inclination, wherein the blades of the first packing element layer include a first set of blades having a first width and a second set of blades having a second width, wherein the second width is narrower than the first width.

2. The packing system of claim 1, wherein the first set of blades includes two groups of blades, wherein a first of the two groups is arranged at a primary angle of inclination and a second of the two groups is arranged at secondary angle of inclination, and wherein the second set of blades includes two groups of blades, wherein a first of the two groups of the second set of blades is arranged at a third angle of inclination and a second of the two groups of the second set of blades is arranged at a fourth angle of inclination, wherein the primary angle of inclination is different from the third angle of inclination.

3. The packing system of claim 1, wherein the first set of blades includes two groups of blades, wherein a first of the two groups is arranged at a primary angle of inclination and a second of the two groups is arranged at a secondary angle of inclination.

4. The packing system of claim 3, wherein the primary angle of inclination and the secondary angle of inclination are opposite angles relative to one another.

5. The packing system of claim 3, wherein at least one of the first group of the first set of blades, or the second group of the first set of blades are parallel to one another.

6. The packing system of claim 1, wherein the second set of blades includes two groups of blades, wherein a first of the two groups is arranged at a primary angle of inclination and a second of the two groups is arranged at a secondary angle of inclination.

7. The packing system of claim 6, wherein the primary angle of inclination and the secondary angle of inclination are opposite angles relative to one another.

8. The packing system of claim 6, wherein at least one of the first group of the second set of blades, or the second group of the second set of blades are parallel to one another.

9. The packing system of claim 1, further comprising at least one additional packing element layer, wherein the at least one additional packing element layer is positioned vertically below the second packing element layer opposite from the first packing element layer, wherein the at least one additional packing element layer includes a plurality of blades.

10. The packing system of claim 9, wherein the blades of the additional packing element layer have the same angle of inclination, spacing and sizing as the blades of the first packing element layer.

11. The packing system of claim 10, wherein the angle of inclination of the blades of the additional packing element layer is the same as, and opposite from the blades of the first packing element layer.

12. A packing system comprising:
    a first packing element layer including a plurality of blades; and
    a second packing element layer including a plurality of blades, wherein the packing system includes at least one of intra-layer variation or inter-layer variation, wherein intra-layer variation includes at least one of (i) varying spacing between blades within at least one of the first packing element layer or the second packing element layer, (ii) varying sizes of the blades within at least one of the first packing element layer or the second packing element layer, or (iii) varying angle of inclination of the blades within at least one of the first packing element layer or the second packing element layer, and wherein inter-layer variation includes the blades of the first packing layer having a first spacing, a first size, and a first angle of inclination and the blades of the second packing layer having a second spacing, a second size, and a second angle of inclination, wherein at least one of the second spacing, the second size, or the second angle of inclination is different from at least one of the first spacing, the first size, or the first angle of inclination, wherein the blades of the first packing element layer are separated from adjacent blades of the first packing element layer by a first spacing, wherein blades of the second packing element layer are separated from adjacent blades of the second packing element layer by a second spacing, wherein the second spacing is smaller than the first spacing.

13. The packing system of claim 12, wherein the blades of the first packing element layer include a first set of blades having a first width and a second set of blades having a second width, wherein the second width is narrower than the first width.

14. The packing system of claim 13, wherein the first set of blades includes two groups of blades, wherein a first of the two groups is arranged at a primary angle of inclination and a second of the two groups is arranged at secondary angle of inclination, and wherein the second set of blades includes two groups of blades, wherein a first of the two groups of the second set of blades is arranged at a third angle of inclination and a second of the two groups of the second set of blades is arranged at a fourth angle of inclination, wherein the primary angle of inclination is different from the third angle of inclination.

15. The packing system of claim 13, wherein the first set of blades includes two groups of blades, wherein a first of the two groups is arranged at a primary angle of inclination and a second of the two groups is arranged at a secondary angle of inclination.

16. The packing system of claim 15, wherein the primary angle of inclination and the secondary angle of inclination are opposite angles relative to one another.

17. The packing system of claim 15, wherein at least one of the first group of the first set of blades, or the second group of the first set of blades are parallel to one another.

18. The packing system of claim 13, wherein the second set of blades includes two groups of blades, wherein a first of the two groups is arranged at a primary angle of inclination and a second of the two groups is arranged at a secondary angle of inclination.

19. The packing system of claim 18, wherein the primary angle of inclination and the secondary angle of inclination are opposite angles relative to one another.

20. The packing system of claim 18, wherein at least one of the first group of the second set of blades, or the second group of the second set of blades are parallel to one another.

21. The packing system of claim 12, further comprising at least one additional packing element layer, wherein the at least one additional packing element layer is positioned vertically below the second packing element layer opposite from the first packing element layer, wherein the at least one additional packing element layer includes a plurality of blades.

22. The packing system of claim 21, wherein the blades of the additional packing element layer have the same angle of inclination, spacing and sizing as the blades of the first packing element layer.

23. The packing system of claim 22, wherein the angle of inclination of the blades of the additional packing element layer is the same as, and opposite from the blades of the first packing element layer.

* * * * *